United States Patent
Sakamoto et al.

(10) Patent No.: US 11,837,095 B2
(45) Date of Patent: Dec. 5, 2023

(54) ALARM DEVICE FOR VEHICLE

(71) Applicant: DENSO CORPORATION, Kariya (JP)

(72) Inventors: Mai Sakamoto, Kariya (JP); Hiroki Hori, Kariya (JP)

(73) Assignee: DENSO CORPORATION, Kariya (JP)

( * ) Notice: Subject to any disclaimer, the term of this patent is extended or adjusted under 35 U.S.C. 154(b) by 187 days.

(21) Appl. No.: 17/477,276

(22) Filed: Sep. 16, 2021

(65) Prior Publication Data

US 2022/0005352 A1     Jan. 6, 2022

Related U.S. Application Data

(63) Continuation of application No. PCT/JP2020/012451, filed on Mar. 19, 2020.

(30) Foreign Application Priority Data

Mar. 20, 2019    (JP) .................................. 2019-053109

(51) Int. Cl.
| | |
|---|---|
| *G08G 1/01* | (2006.01) |
| *B60Q 9/00* | (2006.01) |
| *G01S 13/931* | (2020.01) |
| *G08G 1/16* | (2006.01) |

(52) U.S. Cl.
CPC ............... *G08G 1/16* (2013.01); *B60Q 9/008* (2013.01); *G01S 13/931* (2013.01); *G01S 2013/9315* (2020.01); *G01S 2013/93272* (2020.01)

(58) Field of Classification Search
CPC .......... G08G 1/16; G08G 1/165; G08G 1/166; B60Q 9/008; G01S 13/931; G01S 2013/9315; G01S 2013/93272; G01S 13/56; G01S 13/878
See application file for complete search history.

(56) References Cited

U.S. PATENT DOCUMENTS

| | | | |
|---|---|---|---|
| 8,648,744 B2 * | 2/2014 | Koike | G01S 13/931 342/70 |
| 9,810,782 B2 * | 11/2017 | Schiffmann | G01S 7/415 |
| 10,049,576 B2 * | 8/2018 | Nakatani | G01S 15/87 |
| 10,703,267 B2 * | 7/2020 | Iwasaki | B60N 2/90 |
| 2007/0244641 A1 * | 10/2007 | Altan | B60W 50/16 701/2 |

(Continued)

FOREIGN PATENT DOCUMENTS

| | | |
|---|---|---|
| JP | H05-205198 A | 8/1993 |
| JP | 2014-19194 A | 2/2014 |

(Continued)

*Primary Examiner* — Brian E Miller
(74) *Attorney, Agent, or Firm* — MASCHOFF BRENNAN

(57) ABSTRACT

The alarm device includes an acquisition part, an alarm judging part, a notification part, a static extraction part, a shielding boundary setting part, and a suppression part. The acquisition part acquires reflection point information and object information. The alarm judging part determines whether the object is an alarm candidate for each of the objects. The notification part issues a notification regarding the alarm candidates. The static extraction part extracts static reflection points. The shielding boundary setting part sets an approximate straight line as a shielding boundary by robust estimation. The suppression part suppresses notification of alarm candidates that are on the opposite side of the shielding boundary.

12 Claims, 16 Drawing Sheets

(56) References Cited

U.S. PATENT DOCUMENTS

| | | | | |
|---|---|---|---|---|
| 2010/0201508 | A1* | 8/2010 | Green | B60Q 9/008 340/435 |
| 2012/0041632 | A1* | 2/2012 | Garcia Bordes | B60W 50/14 701/29.1 |
| 2013/0147654 | A1* | 6/2013 | Choi | G01S 13/931 342/70 |
| 2013/0184976 | A1* | 7/2013 | Akiyama | B60W 30/12 701/116 |
| 2013/0218369 | A1 | 8/2013 | Yoshihama et al. | |
| 2013/0342339 | A1* | 12/2013 | Kiefer | G08B 6/00 340/438 |
| 2014/0015693 | A1* | 1/2014 | Komoguchi | G08G 1/166 340/935 |
| 2014/0118130 | A1* | 5/2014 | Chang | B60Q 9/008 340/435 |
| 2016/0039411 | A1* | 2/2016 | Park | B60W 30/09 701/70 |
| 2016/0291149 | A1* | 10/2016 | Zeng | G01S 13/874 |
| 2016/0339782 | A1* | 11/2016 | Seong | B60L 3/0007 |
| 2017/0008517 | A1 | 1/2017 | Himi | |
| 2017/0139043 | A1* | 5/2017 | Takada | G01S 7/412 |
| 2017/0176593 | A1* | 6/2017 | Satou | G01S 13/56 |
| 2018/0086338 | A1* | 3/2018 | Yamada | B60W 10/04 |
| 2018/0297520 | A1* | 10/2018 | Morimura | G02B 27/01 |
| 2019/0033443 | A1* | 1/2019 | Yoshikawa | G08G 1/168 |
| 2019/0101621 | A1* | 4/2019 | Machida | G01S 13/931 |
| 2019/0212439 | A1* | 7/2019 | Nohl | B60T 8/17558 |
| 2019/0275993 | A1* | 9/2019 | Hiromitsu | B60Q 9/008 |
| 2019/0329744 | A1* | 10/2019 | Kim | B60T 8/58 |
| 2019/0362632 | A1* | 11/2019 | Fokin | B60T 7/12 |
| 2019/0379137 | A1* | 12/2019 | Ohguchi | G01S 7/352 |
| 2020/0193830 | A1* | 6/2020 | Kim | G08G 1/166 |
| 2020/0355814 | A1* | 11/2020 | Tsai | H01Q 19/17 |
| 2021/0221363 | A1* | 7/2021 | Lai | B60Q 9/008 |
| 2021/0287548 | A1* | 9/2021 | Lai | B60R 1/025 |
| 2021/0354717 | A1* | 11/2021 | Sakamoto | B60W 30/09 |
| 2022/0005352 | A1* | 1/2022 | Sakamoto | B60Q 9/008 |
| 2023/0022335 | A1* | 1/2023 | Kang | G01S 13/42 |
| 2023/0128234 | A1* | 4/2023 | Okabe | G01S 13/931 701/301 |

FOREIGN PATENT DOCUMENTS

| | | |
|---|---|---|
| JP | 2019-12322 A | 1/2019 |
| KR | 10-2017-0056339 A | 5/2017 |

* cited by examiner x1　　x2　　x3　　x4　　x5

ALARM DEVICE FOR VEHICLE

CROSS-REFERENCE TO RELATED APPLICATION

The present application is a continuation application of International Application No. PCT/JP2020/012451 filed on Mar. 19, 2020, which is based on and claims the benefit of priority from Japanese Patent Application No. 2019-053109 filed on Mar. 20, 2019. The contents of these applications are incorporated herein by reference in their entirety.

BACKGROUND

The present disclosure relates to an alarm device.

A technique called RCTA is known that detects another vehicle approaching the rear of a vehicle (hereinafter also referred to as a host vehicle) when the host vehicle moves backward using a radar placed in the rear part of the host vehicle, and notifies the driver of the host vehicle of the detection result. RCTA is an abbreviation for Rear Cross Traffic Alert.

In the conventional RCTA, even when there is a shielding object such as a guardrail or a fence behind the host vehicle that obstructs passage of vehicles, and another vehicle existing on the other side of the shielding object with respect to the host vehicle is detected, a conventional alarm device would issue a notification based on the presence of the detected other vehicle.

Since the notification is issued despite the fact that the other vehicle could not come into contact with the host vehicle, unnecessary notifications have been issued to the driver of the host vehicle.

JP 2017-13756 A proposes a technique that compares the distance to the other vehicle approaching the host vehicle and the distance to the shielding object behind the host vehicle, and when the distance to the other vehicle is larger than the distance to the shielding object, stops the alarm from being issued to the other vehicle.

The alarm device described in JP 2017-13756 A searches for static objects, and when a plurality of reflection points representing one or more static objects are detected, it determines that a shielding object exist between the reflection points.

As a result of detailed examination by the inventors, in the method described in JP 2017-13756 A, for example, when a plurality of different static objects are detected, it is determined that a shielding object exist between the plurality of static objects. This leads to the problem that, even when there is a gap between shielding objects, it is determined that there is some shielding object between the shielding objects placed apart from each other, where actually no shielding object exists.

SUMMARY

One mode of the present disclosure is an alarm device mounted on a vehicle, including an acquisition part, an alarm judging part, a notification part, a static extraction part, a shielding boundary setting part, and a suppression part. The acquisition part is configured to acquire, from a radar module whose search areas are on the right-rear side and the left-rear side of a host vehicle, which is the vehicle on which the alarm device is mounted, reflection point information and object information. The alarm judging part is configured to use the object information for each of at least one object specified from the object information, whether the object is an alarm candidate that requires notification to a driver of the host vehicle. The notification part is configured to issue a notification to the driver of the host vehicle about the alarm candidate when the host vehicle moves backward. The static extraction part is configured to use the reflection point information to extract a static reflection point from least one reflection point specified from the reflection point information. The shielding boundary setting part is configured to calculate an approximate straight line by performing robust estimation on the position of the static reflection point and set the approximate straight line as a shielding boundary. The suppression part is configured to suppress notification by the notification part regarding the alarm candidate located in a shielding region, which is a region on the opposite side of the shielding boundary when viewed from the host vehicle.

One aspect of the present disclosure is to improve the accuracy of estimating the region in which a shielding object exists.

One mode of the present disclosure is an alarm device mounted on a vehicle, including an acquisition part, an alarm judging part, a notification part, a static extraction part, a shielding boundary setting part, and a suppression part. The acquisition part is configured to acquire, from a radar module whose search areas are on the right-rear side and the left-rear side of a host vehicle, which is the vehicle on which the alarm device is mounted, reflection point information, which is information including a position and behavior of at least one reflection point detected in the search areas, and object information, which is information including a position and behavior of at least one object detected using the reflection point information. The alarm judging part is configured to use the object information acquired by the acquisition part to determine, for each of the at least one object specified from the object information, whether the object is an alarm candidate representing a moving body that requires notification to a driver of the host vehicle. The notification part is configured to issue a notification to the driver of the host vehicle about the alarm candidate when the host vehicle moves backward. The static extraction part is configured to use the reflection point information acquired by the acquisition part to extract a static reflection point, which is the reflection point in a static state, from the least one reflection point specified from the reflection point information. The shielding boundary setting part is configured to calculate an approximate straight line by performing robust estimation on the position of the static reflection point specified from the reflection point information and set the approximate straight line as a shielding boundary. The suppression part is configured to suppress notification by the notification part regarding the alarm candidate located in a shielding region, which is a region on the opposite side of the shielding boundary when viewed from the host vehicle.

According to such a configuration, an approximate straight line representing the position of a shielding object is set by robust estimation as a shielding boundary, and notification regarding the alarm candidates located in a shielding region, which is a region on the opposite side of the shielding boundary when viewed from the host vehicle, is suppressed. In the robust estimation, an average weight is used in the calculation of the approximate straight line. An average weight is the average of the weights set for the reflection points. Each weight takes a positive value from 0 to 1, and the farther the reflection point is from the approximate straight line, the smaller the weight. The weight is set to 0 for static reflection points that are outside the tolerance range, that is, not within a predetermined distance from the approximate straight line.

Therefore, even when a static reflection point representing an object remote from the shielding object corresponding to the approximate straight line is detected, it is possible to prevent the accuracy of calculation of the shielding boundary, which is the approximate straight line representing the position of the shielding object, from deteriorating due to the position of that static reflection point. That is, the accuracy of calculation of an approximate straight line representing the position of the shielding object can be improved.

DETAILED DESCRIPTION

An embodiment of the present disclosure will be described with reference to the drawings.

1. Configuration

Figure 1:
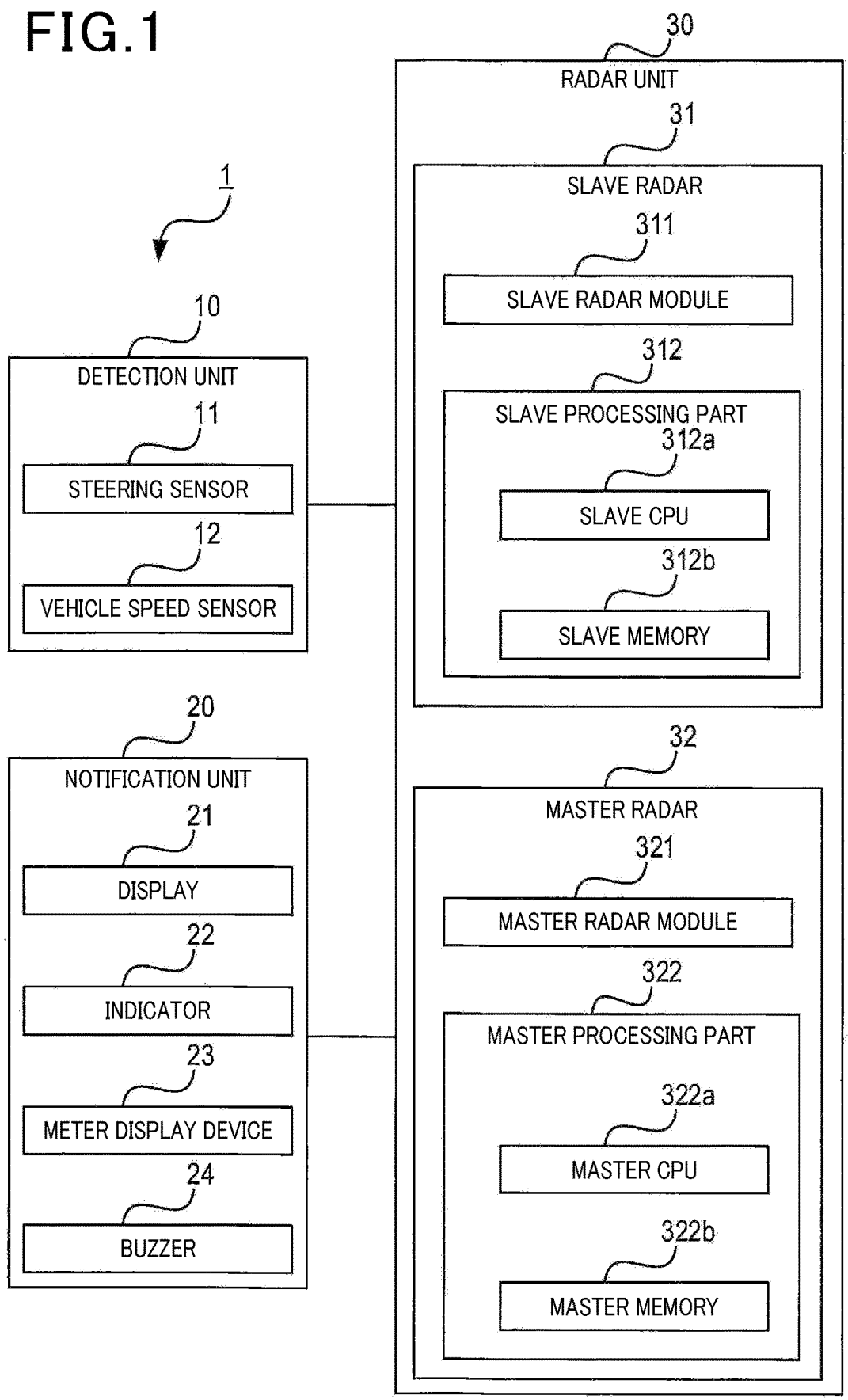
FIG. 1 is a block diagram illustrating the configuration of an alarm system.
Figure 2:
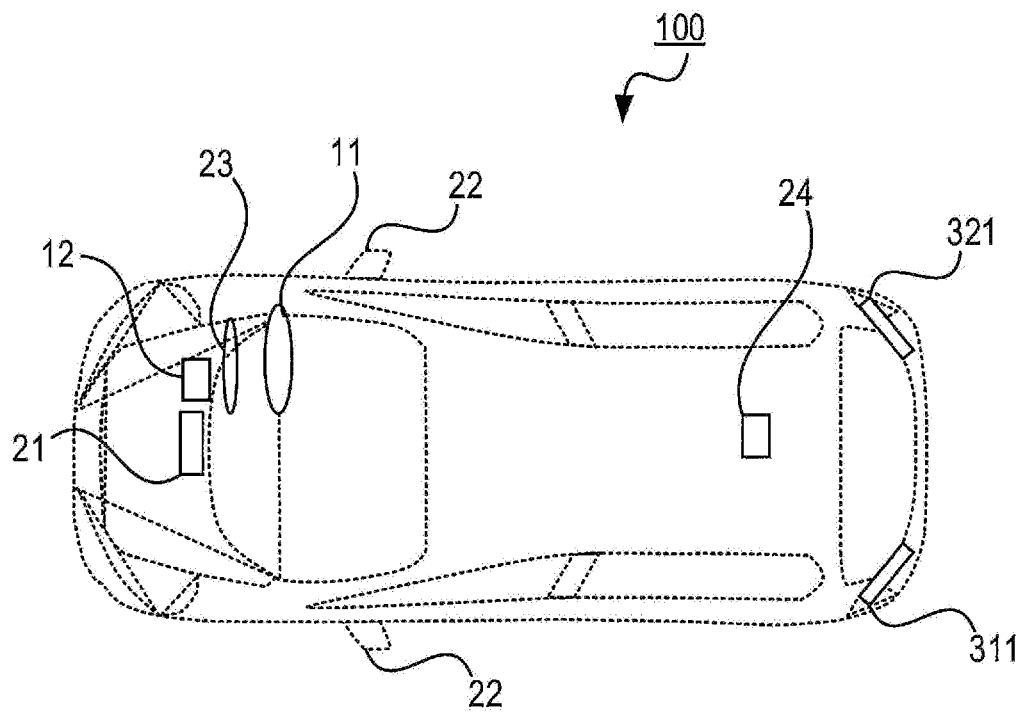
FIG. 2 is a diagram showing the layout of the components of the alarm system.

As shown in FIG. 1, an alarm system 1 comprises a detection unit 10, a notification unit 20, and a radar unit 30. Hereinafter, the vehicle on which the alarm system 1 is mounted will be referred to as a host vehicle 100. FIG. 2 shows examples of positions at which the components of the host vehicle 100 may be placed in the vehicle. The positions of the components of the host vehicle 100 are not limited to those shown in FIG. 2, and they may be provided at positions other than those shown in FIG. 2 as long as they can exert their functions.

The detection unit 10 detects the traveling direction and traveling speed of the host vehicle 100. The detection unit 10 includes a steering sensor 11 and a vehicle speed sensor 12.

The steering sensor 11 measures and outputs the steering angle of the steering wheel of the host vehicle 100. The steering sensor 11 is installed, for example, near the steering wheel of the host vehicle 100.

The vehicle speed sensor 12 measures and outputs the vehicle speed of the host vehicle 100. The vehicle speed sensor 12 is installed, for example, near the front wheels to measure the vehicle speed based on the rotational speed of the front wheels.

The notification unit 20 provides visual and auditory notification to the driver of the host vehicle 100 according to the alarm issuing control by the radar unit 30.

The notification unit 20 includes a display 21, indicators 22, a meter display device 23, and a buzzer 24.

The display 21 displays images. The display 21 is placed near the driver's seat of the host vehicle 100 so that the driver of the host vehicle 100 can see. Note that the display 21 may be provided independently of the screen of the car navigation system of the host vehicle 100, or may be shared with the screen of the car navigation system of the host vehicle 100.

The indicators 22 are lamps placed respectively at the tips of the left and right side-mirrors of the host vehicle 100, and are configured to issue notifications by lighting up and blinking.

The meter display device 23 provides notification through display on the instrumental panel of the host vehicle 100. The display notification by the meter display device 23 may be carried out by displaying predetermined icons.

The buzzer 24 provides sound notification. The buzzer 24 is installed, for example, near the rear seats of the vehicle.

The radar unit 30 includes a slave radar 31 and a master radar 32.

The slave radar 31 includes a slave radar module 311 and a slave processing part 312.

Figure 3:
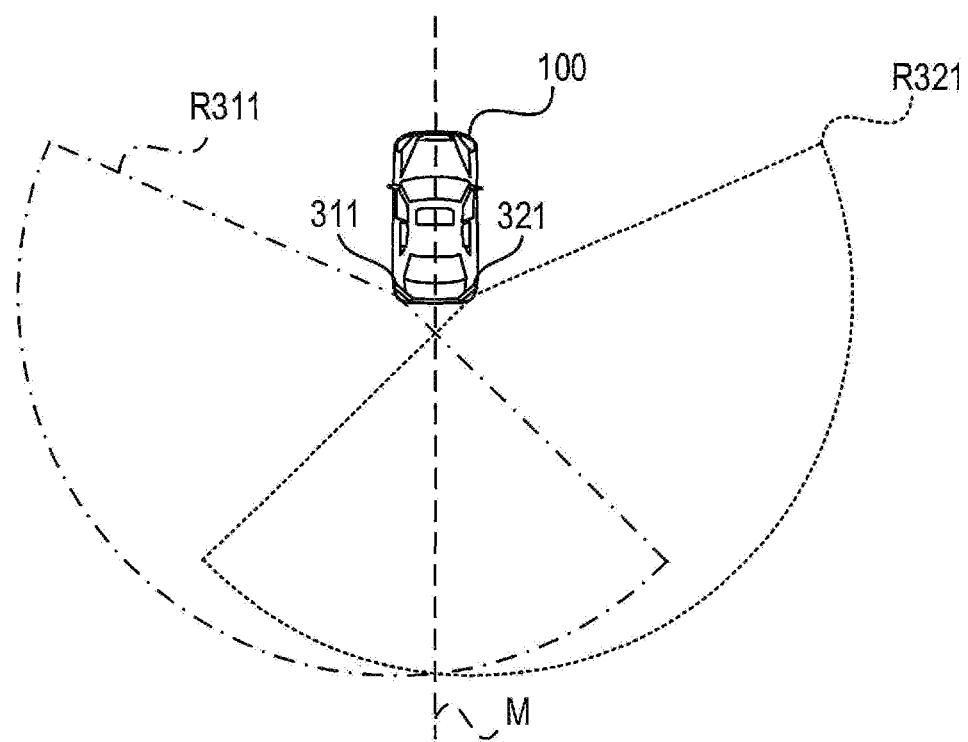
FIG. 3 is a diagram showing the left and right irradiation areas.

The slave radar module 311 is placed in the left rear part of the host vehicle 100, and is configured to output radar waves toward a left irradiation area R311 and receive the radar waves reflected by an object to detect reflection points representing the object existing in the left irradiation area R311. The left irradiation area R311 is, for example, a predetermined area extending from the left front to the right rear of the host vehicle 100 as shown in FIG. 3. Further, the slave radar module 311 measures the position, the traveling direction, and the speed of the object represented by the reflection points with respect to the host vehicle 100 by performing a tracking process for chronologically tracking the reflection points representing one or more objects. In the following, information on the reflection points including the position, the traveling direction, and the speed of the object represented by the measured reflection points with respect to the host vehicle 100 is also referred to as reflection point information. Further, the slave radar module 311 performs a segmentation process in which a plurality of reflection points whose positions and speeds with respect to the host vehicle 100 are close to each other are assumed to represent the same object. Information about a plurality of objects is also referred to as object information. Here, the object information includes the reflection points, the positions, the traveling directions, and the speed of the objects with respect to the host vehicle 100. The position, the traveling direction and the speed of each object may be calculated by, for example, taking an average based on the information of a plurality of reflection points constituting each object.

The slave processing part 312 is a microcomputer including a slave CPU 312a and a semiconductor memory such as RAM or ROM (hereinafter also referred to as slave memory 312b). The slave processing part 312 executes slave alarm processing, which will be described later.

The master radar 32 has the same basic configuration as the slave radar 31.

The master radar 32 includes a master radar module 321 and a master processing part 322.

The slave radar module 311 is provided in the left rear part of the host vehicle 100, while the master radar module 321 is provided in the right rear part of the host vehicle 100.

Further, as shown in FIG. 3, the slave radar module 311 irradiates the left irradiation area R311 with radar waves. The master radar module 321 irradiates the right irradiation area R321 with radar waves. The right irradiation area R321 is, for example, a predetermined area extending from the right front to the left rear of the host vehicle 100. Note that the slave radar module 311 and the master radar module 321 are positioned so that the left irradiation area R311 and the right irradiation area R321 are symmetrical with respect to the center line M of the host vehicle 100. The center line M of the host vehicle 100 is a virtual line extending along the vehicle length direction of the host vehicle 100, representing the center of the host vehicle 100 in the vehicle width direction. The left irradiation area R311 and the right irradiation area R321 correspond to search areas.

The master processing part 322 includes a master CPU322a and a master memory 322b.

While the slave processing part 312 executes the slave alarm processing, the master processing part 322 executes the master alarm processing. The master alarm processing is the same as the slave alarm processing in that the reflection point information and the object information detected by the slave radar 31 and the master radar 32 are acquired. In the slave alarm processing, the acquired reflection point information and object information are output to the master radar 32. On the other hand, in the master alarm processing, the notification unit 20 is subjected to alarm issuing control based on the reflection point information and the object information acquired by the slave radar 31 and the master radar 32.

Note that the components of the alarm system 1 may be connected by, for example, transmission lines forming CAN (registered trademark). That is, the components of the alarm system 1 may communicate according to the CAN protocol. CAN is an abbreviation for Controller Area Network.

The radar unit 30 corresponds to an alarm device.

2. Processing

<Slave Alarm Processing>

Figure 4:
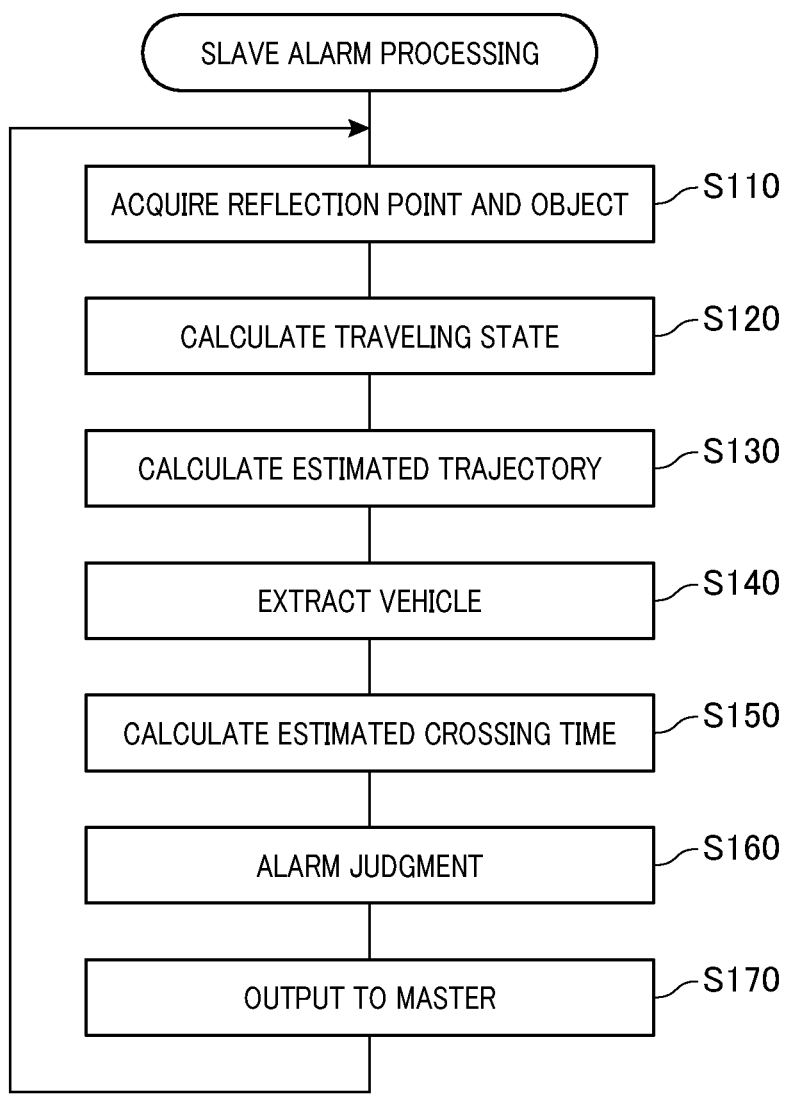
FIG. 4 is a flowchart showing the slave alarm processing.

Next, the slave alarm processing executed by the slave CPU 312a will be described with reference to the flowchart of FIG. 4. The slave alarm processing is executed when the host vehicle 100 moves backward. That is, the slave alarm processing is executed, for example, when the gearshift of the host vehicle 100 is set to the "R" position. The "R" position refers to the reverse range, the position to which the gearshift is moved when the driver wants to move the host vehicle 100 backward.

In S110, the slave CPU 312a acquires the reflection point information and the object information which are information about the reflection points in the left irradiation area R311 detected by the slave radar module 311. Note that, for example, the slave CPU 312a may only acquire the reflection point information related to reflection points detected at the same position more than a predetermined number of times by the tracking processing in the slave radar module 311 and the object information representing objects associated with those reflection points.

In S120, the slave CPU 312a calculates the traveling state of the host vehicle 100, which represents the traveling direction and the vehicle speed of the host vehicle 100, from the steering angle of the steering wheel output by the steering sensor 11 and the vehicle speed output by the vehicle speed sensor 12.

In S130, using the object information acquired in S110, the slave CPU 312a calculates the estimated trajectory P of each of the objects identified by the object information. The estimated trajectory P is calculated based on, for example, the relative speed and traveling direction of the detected object with respect to the host vehicle 100, and the speed and traveling direction of the host vehicle 100 acquired in S120. Specifically, the result obtained by subtracting a host vehicle vector, which represents the speed and traveling direction of the host vehicle 100, from a reflection point vector, which represents the relative speed and traveling direction of each reflection point with respect to the host vehicle 100 acquired by the tracking process of the slave radar module 311, is the estimated trajectory P. In the following, the vector representing the estimated trajectory P is also referred to as a trajectory vector.

In S140, the slave CPU 312a extracts a vehicle(s) existing near the host vehicle 100 as an extracted vehicle from the objects identified by the object information acquired in S110. The extraction of an extracted vehicle may be carried out by extracting an object whose trajectory vector has a magnitude that is larger than a traveling threshold as an extracted vehicle. Further, for example, the value of the traveling threshold may be set to 0, and objects whose trajectory vectors are not zero vectors, that is, moving objects, may be extracted as extracted vehicles. Note that the magnitude of the traveling threshold is not limited to 0, and it may be set to a magnitude that takes into consideration the measurement error of the trajectory vector.

Figure 5:
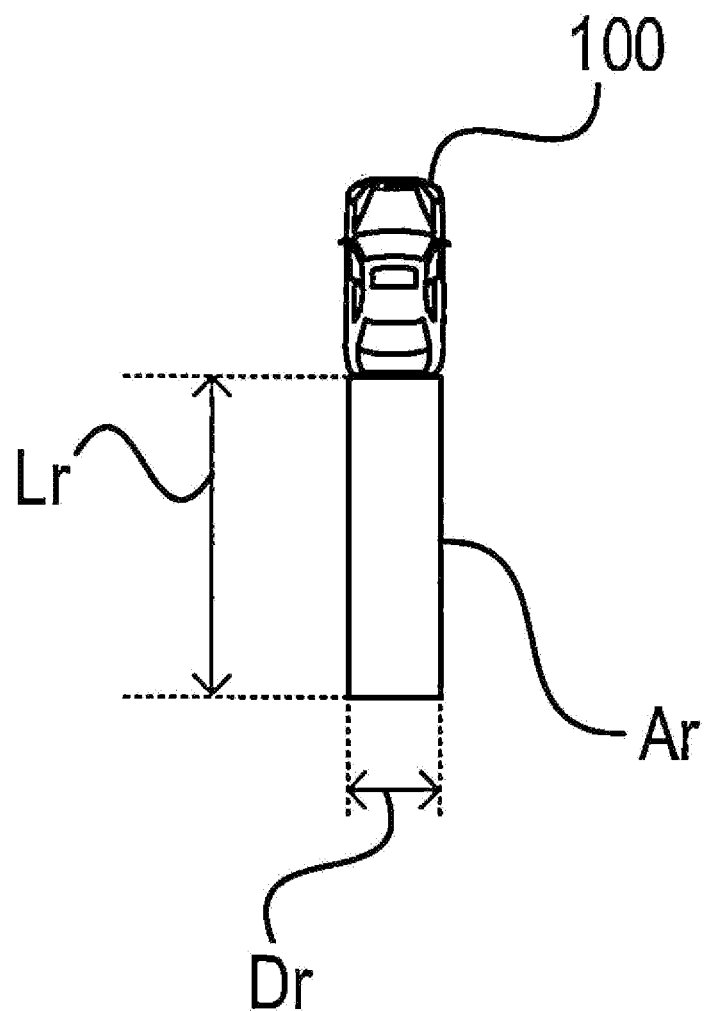
FIG. 5 is a diagram showing the rear area.

In S150, the slave CPU 312a calculates the estimated crossing time of the extracted vehicle extracted in S140. The estimated crossing time is the time it takes until the extracted vehicle reaches a rear area Ar set behind the host vehicle 100. As shown in FIG. 5, the rear area Ar is an area obtained by extending the width Dr corresponding to the width of the host vehicle 100 a length of Lr from the rear end of the host vehicle 100. The length Lr is a predetermined length and may be set at the time the slave radar 31 is manufactured. The length Lr may be preset to a value corresponding to the lane width in the region where the vehicle equipped with the alarm system 1 including the slave radar 31 is used. The estimated crossing time is obtained by dividing the distance to the position at which the estimated trajectory P extending from the position of the extracted vehicle intersects the rear area Ar by the speed of the extracted vehicle.

In S160, of the extracted vehicles extracted in S140, the slave CPU 312a sets an alarm flag for those whose estimated crossing time calculated in S150 is equal to or smaller than a predetermined alarm threshold. That is, an alarm flag is set for extracted vehicles that are predicted to collide with the host vehicle 100 when the host vehicle moves backward. The alarm threshold is set to, for example, 3.5 seconds. The alarm flag may be reset, for example, every time the slave alarm processing is carried out. The reset interval is not limited to every execution, and instead the flag may be reset every several executions. Further, for example, the alarm flag may be set for an object that has been determined, according to the tracking process performed in S110, to be the same object as an extracted vehicle for which an alarm flag has been set.

Extracted vehicles for which alarm flags are set are also referred to as alarm candidates.

In S170, the slave CPU 312*a* outputs, as slave extraction information, information on the extracted vehicles extracted in S160 to the master radar 32. The slave extraction information also includes the object information of the extracted vehicles and information on the alarm flags set in S160 for the extracted vehicles. That is, the extracted vehicles output to the master radar 32 include alarm candidates. Once the slave CPU 312*a* outputs the slave extraction information to the master radar 32, the process proceeds to S110 and the subsequent steps are carried out. That is, the slave processing part 312 repeatedly executes the steps from S110 to S170.

S110 corresponds to the processing as the acquisition part, S130 corresponds to the processing as the trajectory calculation part, and S160 corresponds to the processing as the alarm judging part.

<Master Alarm Processing>

Figure 6:
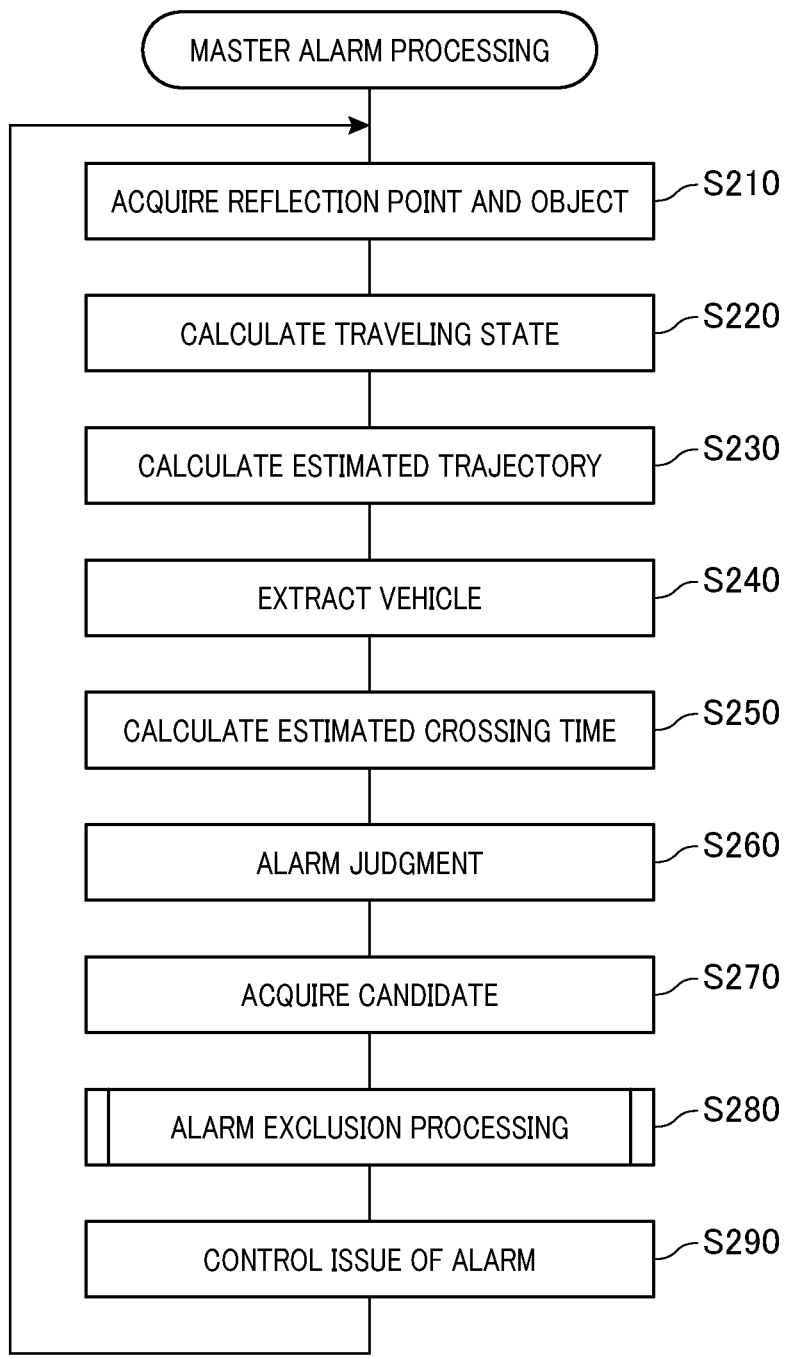
FIG. 6 is a flowchart showing the master alarm processing.

Next, the master alarm processing executed by the master CPU 322*a* will be described with reference to the flowchart of FIG. 6. Note that the master alarm processing and the slave alarm processing are synchronized and executed at the same timing so that objects are detected at the same time in the left irradiation area R311 and the right irradiation area R321. The master alarm processing is executed, for example, when the gearshift of the host vehicle 100 is set to the "R" position. The master alarm processing may be performed once each time the slave alarm processing is performed.

The processing for each of S210, S220, S230, S240, S250, and S260, respectively, in the master alarm processing is basically the same as the processing for each of S110, S120, S130, S140, S150, and S160, respectively, in the slave alarm processing, as previously described. Therefore, redundant and duplicative disclosure has been excluded for the sake of brevity. The slave radar module 311, the slave CPU 312*a*, the slave memory 312*b*, and the left irradiation area R311 in the slave alarm processing correspond to the master radar module 321 and the master CPU 322*a*, the master memory 322*b*, and the right irradiation area R321 in the master alarm processing, respectively.

In S270, the master CPU 322*a* acquires the information on the extracted vehicles extracted in S260 as master extraction information. The master extraction information also includes the object information regarding the extracted vehicles extracted in S260 and information on the alarm flags set in S260 for the extracted vehicles. That is, the master extraction information includes information on the alarm candidates.

Further, the master CPU 322*a* acquires the slave extraction information output in S170 of the slave alarm processing. Hereinafter, the slave extraction information and the master extraction information are collectively referred to as extracted vehicle information.

In S280, the master CPU 322*a* executes alarm exclusion processing. The alarm exclusion processing refers to a process of setting an exclusion flag, which indicates that the extracted vehicle is to be excluded, for extracted vehicles that should be excluded from the extracted vehicles specified by the extracted vehicle information acquired in S270. The details of the alarm exclusion processing will be described later.

In S290, the master CPU 322*a* performs alarm issuing control to output extracted vehicles for which alarm flags have been set in S160 or S260 and exclusion flags have not been set in S280 as alarm targets. In other words, alarm issuing control is performed to output alarm candidates for which exclusion flags have not been set as alarm targets. The master CPU 322*a* returns to S210 and executes the subsequent steps. That is, CPU322*a* repeatedly executes the steps from S210 to S290.

The alarm issuing control is control for notifying the driver using the notification unit 20. The notification to the driver is carried out using at least one of the display 21, indicators 22, meter display device 23, and buzzer 24 included in the notification unit 20.

The mode of notification using the notification unit 20 may be changed, for example, depending on whether the alarm target has been detected in the left irradiation area R311 or the right irradiation area R321. Specifically, for example, in the case notification is performed using the indicators 22, when an alarm target is detected in the left irradiation area R311, the notification may be made by lighting or blinking the indicator 22 mounted on the left side mirror. When an alarm target is detected in the right irradiation area R321, the notification may be made by lighting or blinking the indicator 22 mounted on the right sidemirror. In the case notification is performed using the display 21 or the meter display device 23, the notification may be made by displaying the direction in which the alarm target exists.

S210 corresponds to the processing as the acquisition part, S230 corresponds to the processing as the trajectory calculation part, S260 corresponds to the processing as the alarm judging part, and S290 corresponds to the processing as the notification part.

<Alarm Exclusion Processing>

Figure 7:
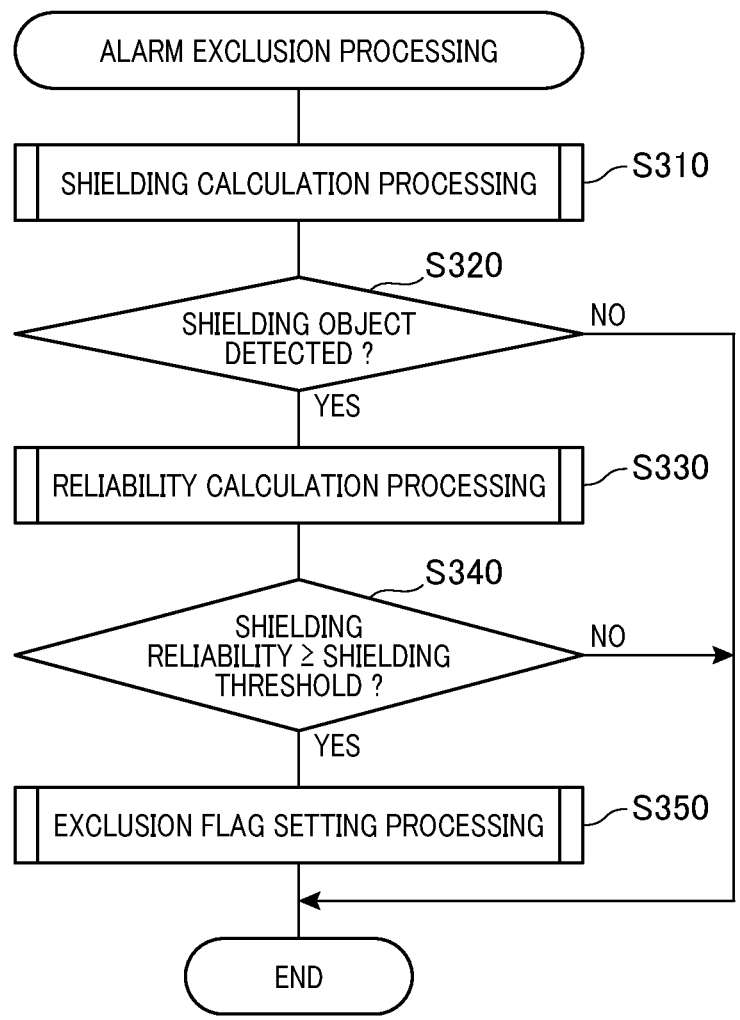
FIG. 7 is a flowchart showing the alarm exclusion processing.

Next, the alarm exclusion processing executed by the master CPU 322*a* in S280 will be described with reference to the flowchart of FIG. 7.

In S310, the master CPU 322*a* executes shielding calculation processing. Although the details of the shielding calculation processing will be described later, in the shielding calculation processing, an approximate straight line representing the position of the shielding object is calculated based on the positions of the static reflection points, which are reflection points representing one or more static objects near the host vehicle 100. For example, the master CPU 322*a* determines whether a reflection point is static by judging that a reflection point whose reflection point vector, which is a vector representing the movement of the reflection point, is an inverse vector of the host vehicle vector, that is, judging that a reflection point whose trajectory vector, which is a vector obtained by subtracting the host vehicle vector from the reflection point vector, as a zero vector is a static reflection point. The term "shielding object" referred to here means an object that obstructs passage of vehicles. An example of a shielding object is an object standing on the ground on which the host vehicle 100 is present. The shielding object is, for example, a guardrail or a wall extending in one direction when viewed from above with respect to the ground. Further, in the following, the direction in which the shielding object extends when viewed from above with respect to the ground is also simply referred to as the direction of the shielding object.

In S320, the master CPU 322a determines whether a shielding object has been detected based on the calculation results of the shielding calculation processing in S310.

When the master CPU 322a determines in S320 that no shielding object has been detected, the master CPU 322a ends the alarm exclusion processing.

On the other hand, when the master CPU 322a determines in S320 that a shielding object has been detected, the process proceeds to S330.

In S330, the master CPU 322a executes reliability calculation processing. Although the details of the reliability calculation processing will be described later, in the reliability calculation processing, shielding reliability is calculated which represents the reliability of the shielding object represented by the approximate straight line calculated in S310. The shielding reliability referred to here represents the certainty that the detected shielding object is exist.

In S340, the master CPU 322a determines whether the shielding reliability calculated in S330 is equal to or greater than a predetermined shielding threshold. The shielding threshold is a value associated with the shielding reliability of shielding objects, and is set to a value above which it can be determined that a shielding object exists. For example, it may be set to 5.

When the master CPU 322a determines in S340 that the shielding reliability is lower than the shielding threshold, the master CPU 322a ends the alarm exclusion processing.

On the other hand, when the master CPU 322a determines in S340 that the shielding reliability is equal to or greater than the shielding threshold, the process proceeds to S350.

In S350, the master CPU 322a performs exclusion flag setting processing and ends the alarm exclusion processing. Although the details of the exclusion flag setting processing will be described later, it refers to a process of setting an exclusion flag for those of the extracted vehicles that meet predetermined exclusion conditions.

S330 corresponds to the processing as the reliability calculation part. S350 corresponds to the processing as the suppression part.

<Shielding Calculation Processing>

Figure 8:
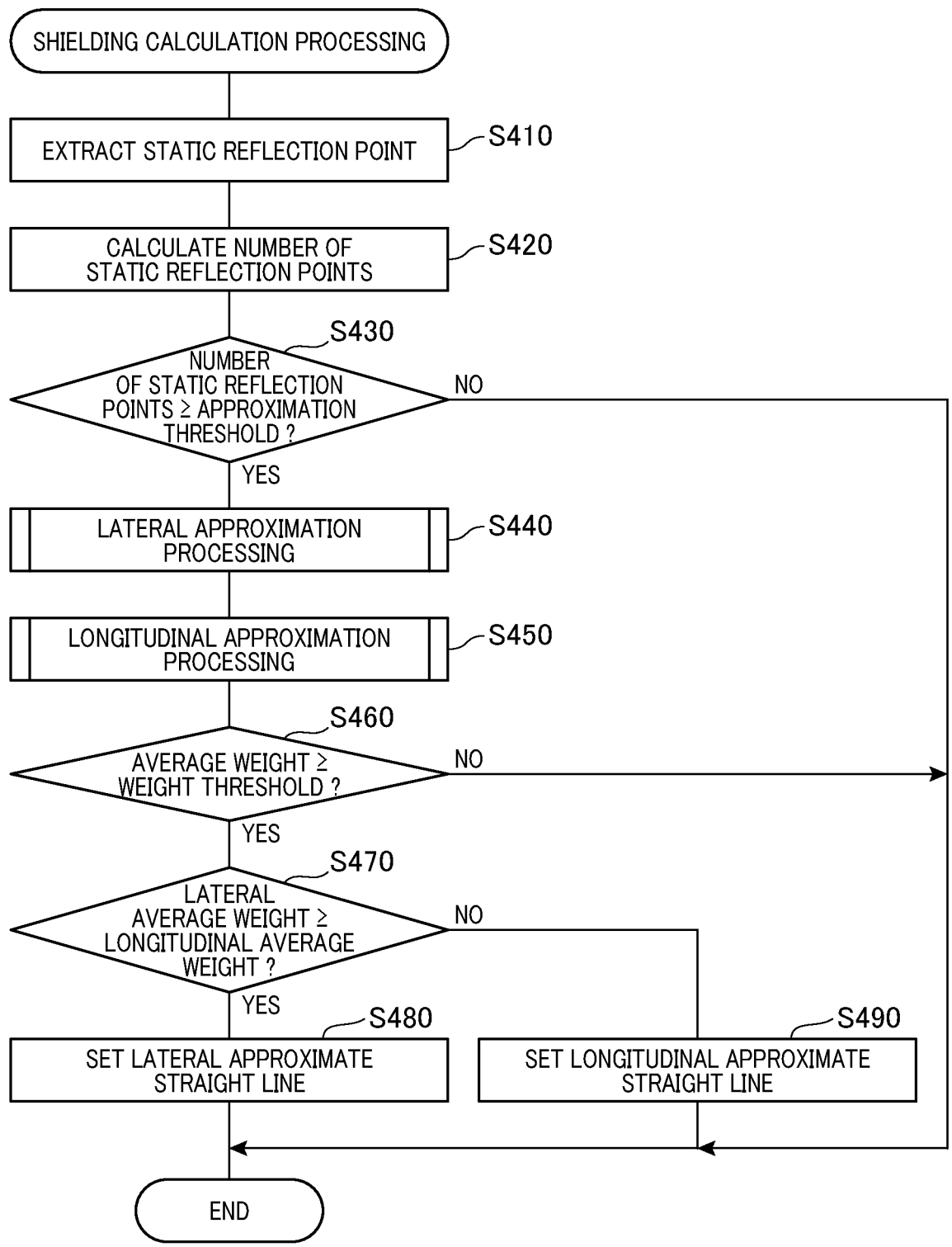
FIG. 8 is a flowchart showing the shielding calculation processing.

Next, the details of the shielding calculation processing executed by the master CPU 322a in S310 will be described with reference to the flowchart of FIG. 8.

In S410, the master CPU 322a extracts static reflection points from the reflection points specified by the reflection point information acquired in S110 and S210.

In S420, the master CPU 322a calculates the number of static reflection points extracted in S410.

In S430, the master CPU 322a determines whether the number of static reflection points calculated in S420 is equal to or greater than a predetermined approximation threshold. The approximation threshold is the minimum number of static reflection points required to calculate an approximate straight line representing the distribution of the positions of the static reflection points. For example, the approximation threshold may be set to 8 points.

When the master CPU 322a determines in S430 that the number of static reflection points is lower than the approximation threshold, the master CPU 322a ends the shielding calculation processing.

On the other hand, when the master CPU 322a determines in S430 that the number of static reflection points is equal to or greater than the approximation threshold, the process proceeds to S440.

In S440, the master CPU 322a executes lateral approximation processing to calculate a lateral approximate straight line WL. The details of the lateral approximation processing will be described later. The lateral approximate straight line WL is an approximate straight line calculated so that the average lateral weight is maximized. The average lateral weight is a value that increases as the vehicle length approximation error, which is an approximation error corresponding to the distances between the lateral approximate straight line WL and the static reflection points along the vehicle length direction, decreases. That is, the average lateral weight represents the degree to which the lateral approximate straight line WL calculated by the lateral approximation processing follows the distribution of the static reflection points. The average lateral weight is represented by a positive value from 0 to 1.

In S450, the master CPU 322a executes longitudinal approximation processing to calculate a longitudinal approximate straight line LL. The details of the longitudinal approximation processing will be described later. The longitudinal approximate straight line LL is an approximate straight line calculated so that the average longitudinal weight is maximized. The average longitudinal weight is a value that increases as the vehicle width approximation error, which is an approximation error corresponding to the distances between the longitudinal approximate straight line LL and the static reflection points along the vehicle width direction, decreases. That is, the average longitudinal weight represents the degree to which the longitudinal approximate straight line LL calculated by the longitudinal approximation processing follows the distribution of the static reflection points. The average longitudinal weight is represented by a positive value from 0 to 1.

That is, the lateral approximate straight line WL calculated by the lateral approximation processing and the longitudinal approximate straight line LL calculated by the longitudinal approximation processing are different in that the average weight to be maximized when calculating the approximate straight line is the average lateral weight for the former and the average longitudinal weight for the latter.

In S460, the master CPU 322a determines whether at least one of the average lateral weight and the average longitudinal weight is equal to or greater than a predetermined weight threshold. The weight threshold is set to, for example, 0.9. That is, in S460, it is determined whether at least one of the lateral approximate straight line WL and the longitudinal approximate straight line LL matches with the distribution of the positions of the static reflection points.

When the master CPU 322a determines in S460 that both the average lateral weight and the average longitudinal weight are smaller than the predetermined weight threshold, it determines that both the lateral approximate straight line WL and the longitudinal approximate straight line LL do not match with the distribution of the positions of the static reflection points, and ends the shielding calculation process.

On the other hand, when the master CPU 322a determines in S460 that one of the average lateral weight and the average longitudinal weight is equal to or greater than the predetermined weight threshold, the process proceeds to S470.

In S470, the master CPU 322a determines whether the average lateral weight is equal to or greater than the average longitudinal weight. That is, the lateral approximate straight line WL and the longitudinal approximate straight line LL are compared to determine if the lateral approximate straight line WL fits the distribution of the positions of the static reflection points better than the longitudinal approximate straight line LL does.

When the master CPU 322a determines in S470 that the average lateral weight is equal to or greater than the average longitudinal weight, the process proceeds to S480.

In S480, the master CPU 322a determines that the lateral approximate straight line WL is an approximate straight line representing the distribution of the positions of static reflection points representing a shielding object, sets the lateral approximate straight line WL as a shielding boundary, and then terminates the shielding calculation process.

On the other hand, when the master CPU 322a determines in S470 that the average lateral weight is smaller than the average longitudinal weight, the process proceeds to S490.

In S490, the master CPU 322a determines that the longitudinal approximate straight line LL is an approximate straight line representing the distribution of the positions of static reflection points representing a shielding object, sets the longitudinal approximate straight line LL as a shielding boundary, and then terminates the shielding calculation process.

S410 corresponds to the processing as the static extraction part. S470 to S490 correspond to the processing as the approximate straight line setting part. S470 corresponds to the processing as the direction determination part. S440, S450, S480, and S490 correspond to the processing as the shielding boundary setting part.

<Lateral Approximation Processing>

Figure 9:
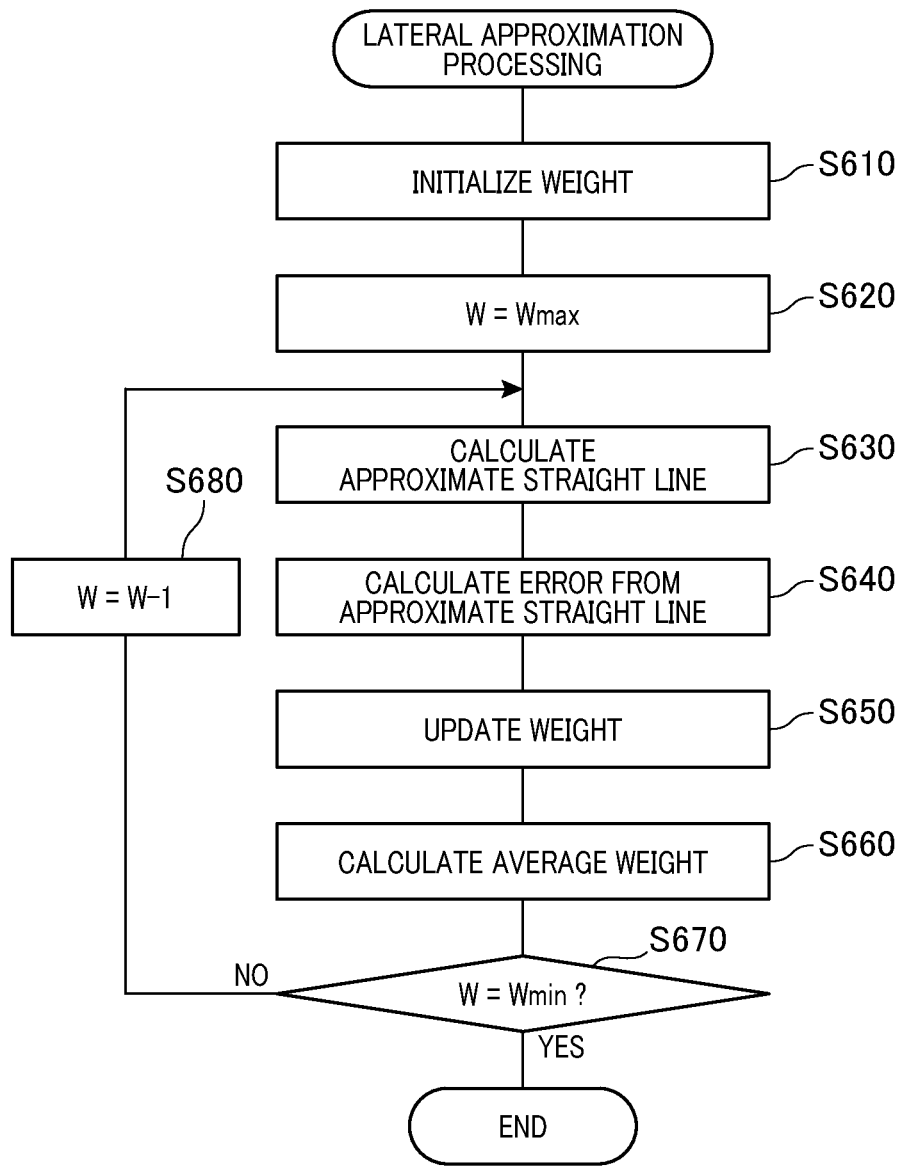
FIG. 9 is a flowchart showing the lateral approximation processing.

Next, the details of the lateral approximation processing executed by the master CPU 322a in S440 will be described with reference to the flowchart of FIG. 9. Note that the lateral approximation processing is processing for calculating the lateral approximate straight line WL representing the positions of reflection points and extending in a direction along the vehicle width direction by using robust estimation.

Figure 10:
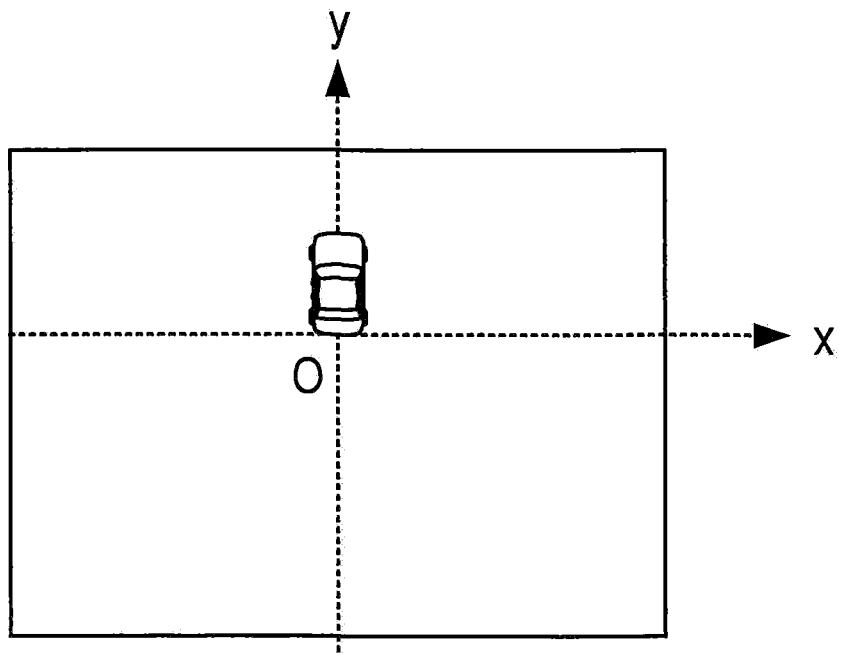
FIG. 10 is a diagram showing the xy plane.

The lateral approximation processing is performed using an xy plane set as shown in FIG. 10. The xy plane is a plane as viewed from directly above the host vehicle 100. The x-axis represents the vehicle width direction of the vehicle 100, the y-axis represents the vehicle length direction, and a position at the center of the vehicle 100 in the vehicle width direction and at the rear end of the vehicle body of the vehicle 100 is the origin O. Further, the xy plane is set to have a size that contains the left irradiation area R311 and the right irradiation area R321.

The lateral approximation processing is a process of calculating the lateral approximate straight line WL representing the positions of the static reflection points by robust estimation based on the approximation errors d of the positions of the static reflection points in the direction along the y-axis in the xy plane.

The specific steps of this process will now be described.

In S610, the master CPU 322a initializes the weights. Specifically, the master CPU 322a sets the weight set for each static reflection point to 1. Although the method of calculating the weights will be described in detail in connection with S650, the weights calculated by the robust estimation each have a positive value from 0 to 1, and the value corresponds to the smallness of the approximation error d between the approximate straight line and the static reflection point. That is, the closer the static reflection point is to the calculated approximate straight line, the larger the value of the weight. Initially, a weight value of 1 is equally set for all of the static reflection points.

In S620, the master CPU 322a sets the tolerance range W used for robust estimation to the upper limit Wmax of the tolerance range. The tolerance range W represents the range of static reflection points used for calculating the approximate straight line, and a distance from the calculated approximate straight line is set. The maximum value Wmax of the tolerance range may be set to, for example, 15 m.

In S630, the master CPU 322a calculates the approximate straight line.

The approximate straight line is represented by the equation y=ax+b which is a straight line in the xy plane, where a represents the slope of the approximate straight line, and b represents the y-intercept of the approximate straight line.

When the weights are set to 1, the slope a of the approximate straight line and the y-intercept b of the approximate straight line are calculated by solving the following equation (1), which is an equation of the least squares method.

That is, the slope a of the approximate straight line and the y-intercept b of the approximate straight line are obtained by the following equation (2).

[Eq. 1]

$$\begin{pmatrix} \sum x_i^2 & \sum x_i \\ \sum x_i & 1 \end{pmatrix} \begin{pmatrix} a \\ b \end{pmatrix} = \begin{pmatrix} \sum x_i y_i \\ \sum y_i \end{pmatrix} \quad (1)$$

$$\begin{pmatrix} a \\ b \end{pmatrix} = \begin{pmatrix} \sum x_i^2 & \sum x_i \\ \sum x_i & 1 \end{pmatrix}^{-1} \begin{pmatrix} \sum x_i y_i \\ \sum y_i \end{pmatrix} \quad (2)$$

In these equations, x represents the x-coordinate value of each static reflection point, y represents the y-coordinate value of each static reflection point, and the subscript i represents the number assigned to each static reflection point.

That is, a straight line that minimizes the sum of the squares of the approximation errors d between the reflection points and the approximate straight line is calculated. An approximate straight line that minimizes the sum of the absolute values of the approximation errors d is thus calculated.

The approximate straight line calculated by setting the weight of each static reflection point to 1 in S630, also referred to as the preliminary approximate straight line, corresponds to the lateral preliminary straight line.

In S640, the master CPU 322a calculates the approximation errors d between the approximate straight line calculated in S630 and the static reflection points. The approximation error d between the approximate straight line and each static reflection point is the distance between the static reflection point and the approximate straight line in the vehicle length direction, that is, the distance in the y-axis direction.

In S650, the master CPU 322a updates the weight set to each static reflection point based on the approximation error d between the approximate straight line and the static reflection point.

The weight set for each static reflection point is expressed by the following equation (3).

[Eq. 2]

$$w(d) = \begin{cases} \left\{1 - \left(\dfrac{d}{W}\right)^2\right\}^2 & (|d| \le W) \\ 0 & (|d| > W) \end{cases} \quad (3)$$

Specifically, when the absolute value of the approximation error d of the static reflection point is larger than the tolerance range W, that is, when the distance of the static reflection point from the approximate straight line in the vehicle length direction is greater than the distance set by the tolerance range W, a weight of 0 is set for the static reflection point.

When the absolute value of the approximation error d of the static reflection point is within the tolerance range W, that is, when the distance of the static reflection point from the approximate straight line in the vehicle length direction is not greater than the distance set by the tolerance range W, a positive value corresponding to the values of the approximation error d and the tolerance range W is set as the weight.

The smaller the approximation error d from the approximate straight line, the greater the weight set when the position of the static reflection point is within the tolerance range W. In other words, the closer the static reflection point is to the approximate straight line, the greater the weight. The approximation error d obtained in this calculation corresponds to the vehicle length approximation error.

In S660, the master CPU 322a calculates the average weight, which is the average of the weights calculated for the static reflection points. The average weight calculated in the lateral approximation processing is referred to as a lateral average weight.

In S670, the master CPU 322a determines whether the tolerance range W is the lower limit Wmin of the tolerance range. The lower limit Wmin of the width of the tolerance range W may be set to, for example, 10 m.

When the master CPU 322a determines in S670 that the tolerance range W is not the lower limit Wmin of the tolerance range, the process proceeds to S680.

In S680, the master CPU 322a subtracts 1 from the value of the tolerance range W, returns to S630, and executes the subsequent steps. That is, the approximate straight line is calculated again after narrowing down the tolerance range W.

In the second and subsequent cycles, the approximate straight line is calculated using the weights set for the static reflection points. That is, the approximate straight line is calculated based on the positions of the static reflection points that were in the tolerance range W in the previous S650. Specifically, it is calculated by solving the following equation (4). The slope a of the approximate straight line and the y-intercept b of the approximate straight line are represented by the following equation (5).

[Eq. 3]

$$\begin{pmatrix} \sum w_i x_i^2 & \sum w_i x_i \\ \sum w_i x_i & \sum w_i \end{pmatrix} \begin{pmatrix} a \\ b \end{pmatrix} = \begin{pmatrix} \sum w_i x_i y_i \\ \sum w_i y_i \end{pmatrix} \quad (4)$$

$$\begin{pmatrix} a \\ b \end{pmatrix} = \begin{pmatrix} \sum w_i x_i^2 & \sum w_i x_i \\ \sum w_i x_i & \sum w_i \end{pmatrix}^{-1} \begin{pmatrix} \sum w_i x_i y_i \\ \sum w_i y_i \end{pmatrix} \quad (5)$$

In S640, the approximation errors d between the approximate straight line represented by the calculated slope a and y-intercept b and the static reflection points are calculated.

In S650, the weights are updated based on the approximation errors d calculated in S640, and in S660, the lateral average weight, which is the average of the updated weights of the static reflection points, is calculated.

The approximate straight line y=ax+b is calculated until the tolerance range W reaches the lower limit Wmin of the tolerance range in S670.

On the other hand, when the master CPU 322a determines in S670 that the tolerance range W is the lower limit Wmin of the tolerance range, it terminates the lateral approximation processing.

The approximate straight line calculated using the weights of the static reflection points calculated in S630 before terminating the lateral approximation processing, also referred to as the final approximate straight line, corresponds to the lateral approximate straight line WL.

The steps carried out in the longitudinal approximation processing are basically the same as those of the lateral approximation processing. However, they differ in that, when calculating the approximation errors d from the approximate straight line, the approximation errors d in the vehicle length direction (that is, the direction along the y-axis) were calculated in the lateral approximation processing, whereas the approximation errors d in the vehicle width direction (that is, the direction along the x-axis) are calculated in the longitudinal approximation processing. The approximation errors in the longitudinal approximation processing are also referred to as vehicle width approximation errors. The preliminary approximate straight line calculated in the longitudinal approximation processing is also referred to as a longitudinal preliminary straight line.

S660 corresponds to the processing as the average weight calculation part. S630 corresponds to the processing as the preliminary straight line approximation part and the final straight line approximation part. Calculating the approximate straight line by setting the weight of each static reflection point to 1 in S630, i.e., the preliminary approximate straight line, corresponds to the processing as the preliminary straight line approximation part. Calculating the approximate straight line using the weights calculated based on the approximation errors d between the preliminary approximate straight line and the static reflection points in S630 corresponds to the processing as the final straight line approximation part.

<Reliability Calculation Processing>

Figure 11:
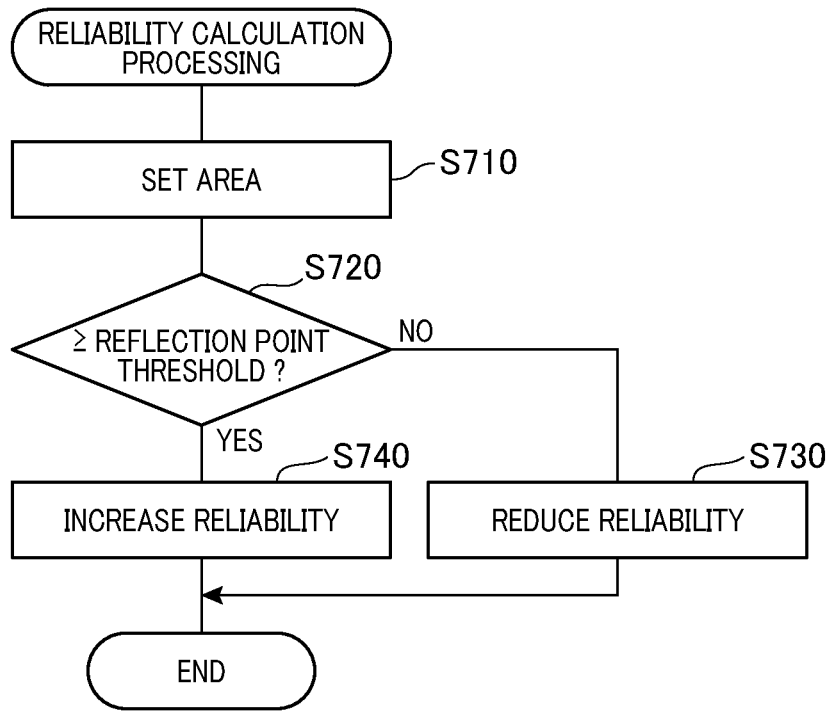
FIG. 11 is a flowchart showing the reliability calculation processing.

Next, the details of the reliability calculation processing executed by the master CPU 322a in S330 will be described with reference to the flowchart of FIG. 11.

Figure 12:
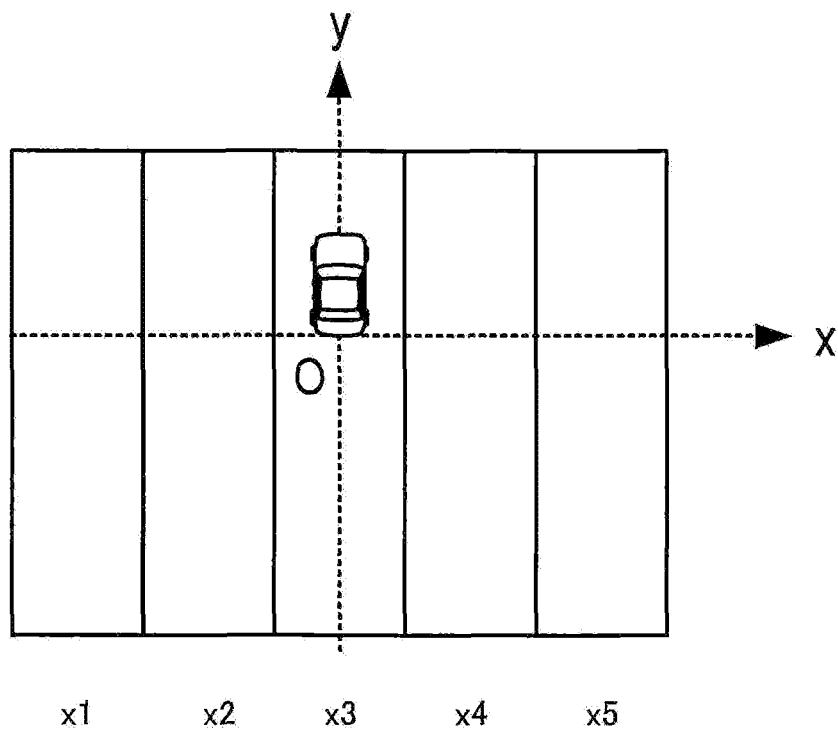
FIG. 12 is a diagram showing laterally-segmented areas.

In S710, the master CPU 322a performs area setting. The area setting is performed as follows. When a lateral approximate straight line WL is set in the shielding calculation processing of S310, a plurality of laterally-segmented areas splitting the xy plane along the y-axis direction are set as shown in FIG. 12. Area indexes x1 to x5 are assigned to the laterally-segmented areas in order from the left side of the host vehicle 100. The center position of the area x3 in the vehicle width direction coincides with the center of the host vehicle 100 in the vehicle width direction, and the length of each area in the vehicle width direction is set to 12 m.

Figure 13:
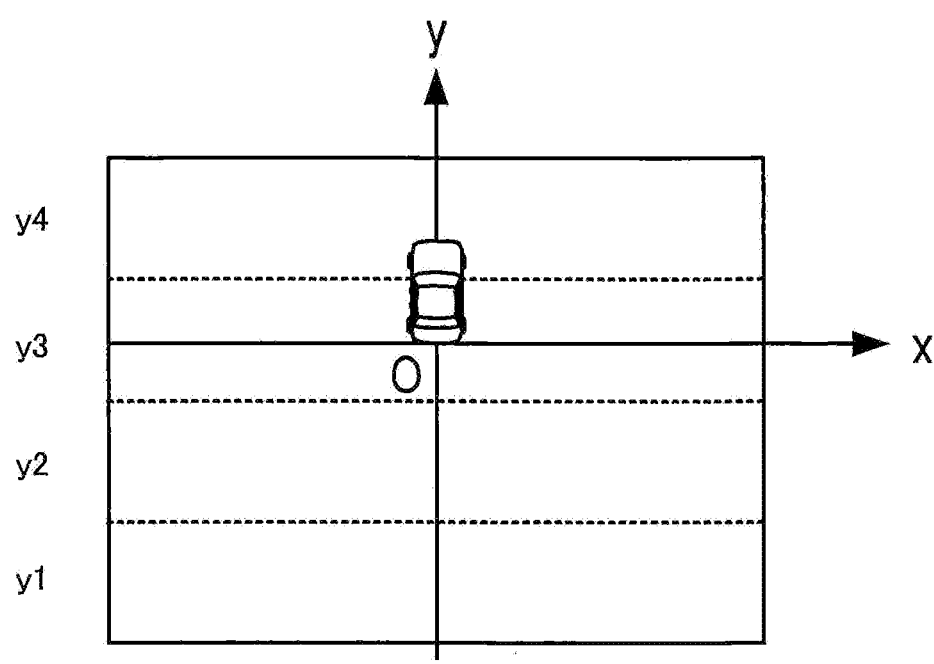
FIG. 13 is a diagram showing longitudinally-segmented areas.

On the other hand, when a longitudinal approximate straight line LL is set in the shielding calculation processing of S310, a plurality of longitudinally-segmented areas splitting the xy plane along the x-axis direction are set as shown in FIG. 13. Area indexes y1 to y4 are assigned to the longitudinally-segmented areas in order from the rear side of the host vehicle 100. The center position of the area y3 in the vehicle length direction overlaps with the rear end of the host vehicle 100. The length of each area in the vehicle length direction is set to 12 m.

In the following, the set laterally- or longitudinally-segmented areas are also simply referred to as segmented areas.

In S720, the master CPU 322a determines, for each of the segmented areas set in S710, whether the number of static reflection points in the segmented area is equal to or greater than a reflection point threshold. For example, the reflection point threshold may be set to 1. That is, in S720, it may be determined, for each of the segmented areas, whether there is at least one static reflection point in the segmented area.

Figure 14:
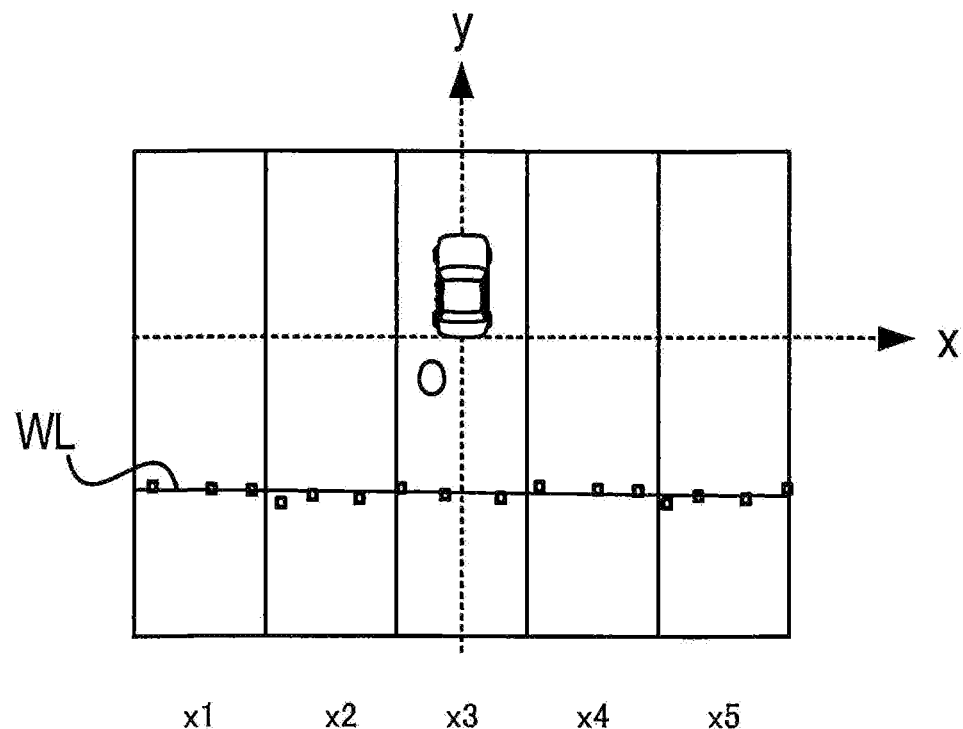
FIG. 14 is a diagram showing an example of a calculated lateral approximate straight line.

A specific example will be described where laterally-segmented areas are set in S710 and the lateral approximate straight line WL is represented as shown in FIG. 14. The number of static reflection points included in the lateral approximate straight line WL in each laterally-segmented area is calculated.

When the master CPU 322a determines in S720 that there is one or more segmented areas that include less static reflection points than the reflection point threshold, the process proceeds to S730.

Figure 15:
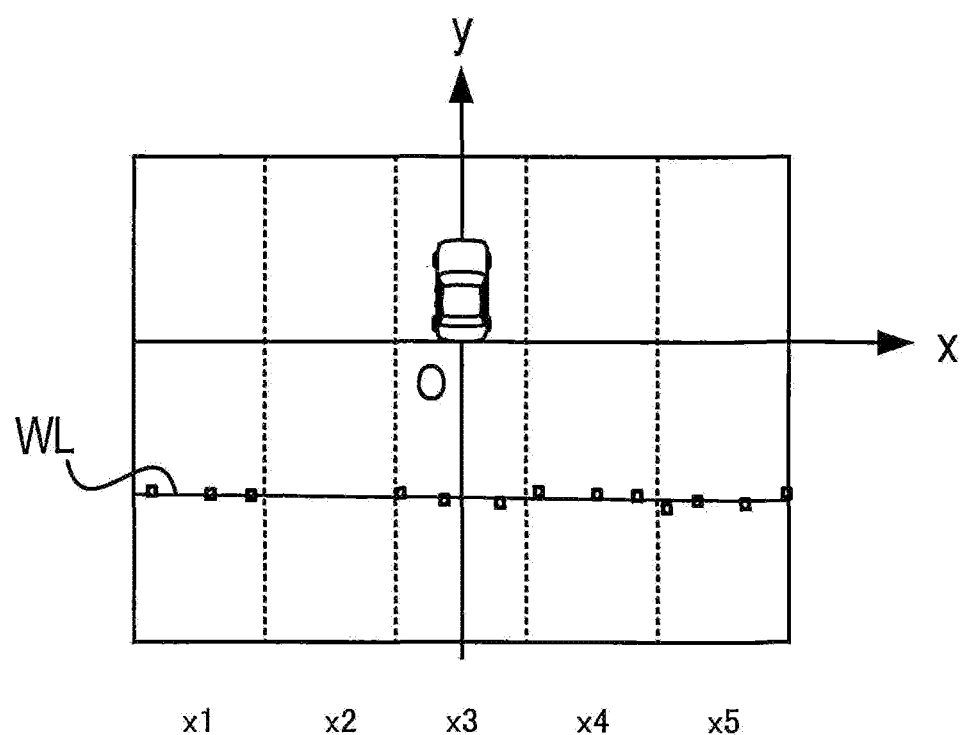
FIG. 15 is a diagram showing a lateral approximate straight line in a case where there is a laterally-segmented area in which the number of detected static reflection points is smaller than the reflection point threshold.

The case where it is determined in S720 that there is one or more segmented areas that include less static reflection points than the reflection point threshold refers to cases such as, specifically, when the segmented area x2 includes less static reflection points than the reflection point threshold as shown in FIG. 15.

In S730, the master CPU 322a subtracts a predetermined subtraction value from the shielding reliability and ends the reliability calculation processing. The subtraction value may be set to 1.

On the other hand, when the master CPU 322a determines in S720 that none of the segmented areas include less static reflection points than the reflection point threshold, in other words, all of the segmented areas include the same number of static reflection points as the reflection point threshold or more, the process proceeds to S740.

In S740, the master CPU 322a adds a predetermined addition value to the shielding reliability and ends the reliability calculation processing. The addition value may be set to 1.

That is, the shielding reliability is added or subtracted each time the reliability calculation processing is performed. The shielding reliability may be reset to 0 when the master alarm processing is started.

S710 corresponds to the processing as the area setting part.

<Exclusion Flag Setting Processing>

Figure 16:
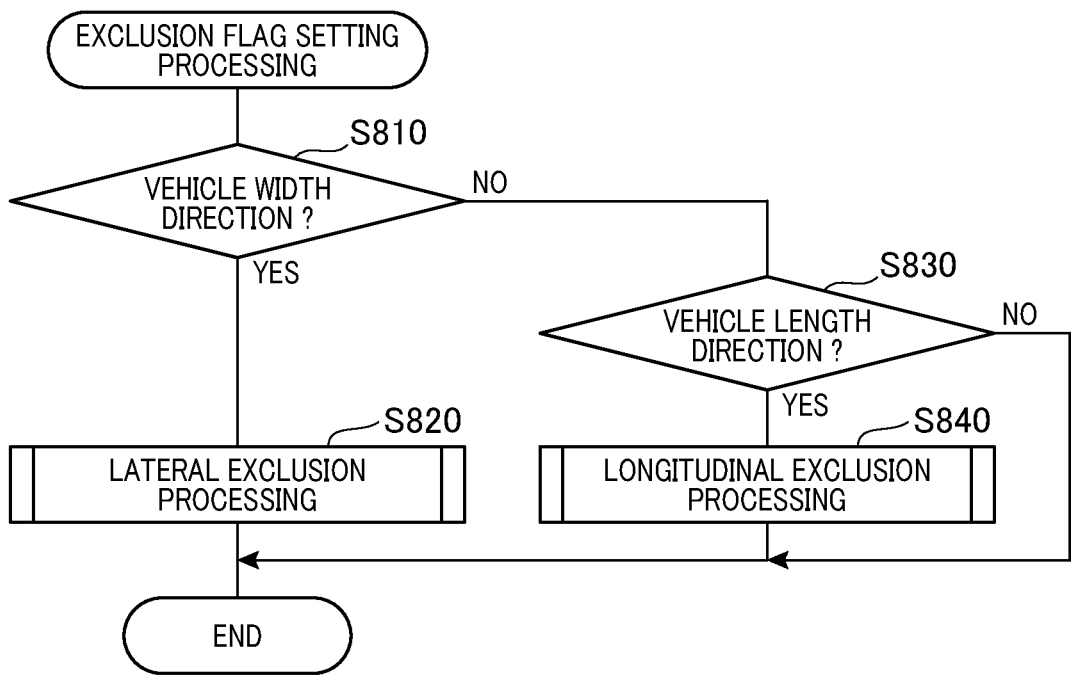
FIG. 16 is a flowchart showing the exclusion flag setting processing.

Next, the details of the exclusion flag setting processing executed by the master CPU 322a in S350 will be described with reference to the flowchart of FIG. 16.

In S810, the master CPU 322a determines whether the orientation of the shielding object is closer to the vehicle width direction than to the vehicle length direction. The orientation of the shielding object being closer to the vehicle width direction means that it was determined in S470 that the average lateral weight is equal to or greater than the average longitudinal weight, and, in S480, a lateral approximate straight line WL was set for the shielding boundary as an approximate straight line representing the distribution of static reflection points.

When the master CPU 322a determines in S810 that the orientation of the shielding object is closer to the vehicle width direction than to the vehicle length direction, the process proceeds to S820.

In S820, the master CPU 322a performs lateral exclusion processing and terminates the exclusion flag setting processing. Although the details of the lateral exclusion processing will be described later, in the lateral exclusion processing, based on the position of the lateral approximate straight line WL, an exclusion flag is set for extracted vehicles that are farther than the lateral approximate straight line WL from the host vehicle 100 to exclude them from alarm targets.

On the other hand, when the master CPU 322a determines in S810 that the orientation of the shielding object is not closer to the vehicle width direction than to the vehicle length direction, the process proceeds to S830. In S830, the master CPU 322a determines whether the orientation of the shielding object is closer to the vehicle length direction than to the vehicle width direction. The orientation of the shielding object being closer to the vehicle length direction than to the vehicle width direction means that it was determined in S470 that the average lateral weight is smaller than the average longitudinal weight, and, in S490, a longitudinal approximate straight line LL was set for the shielding boundary as an approximate straight line representing the distribution of static reflection points.

When the master CPU 322a determines in S830 that the orientation of the shielding object is closer to the vehicle length direction than to the vehicle width direction, the process proceeds to S840.

In S840, the master CPU 322a performs longitudinal exclusion processing and terminates the exclusion flag setting processing. Although the details of the longitudinal exclusion processing will be described later, in the longitudinal exclusion processing, based on the position of the longitudinal approximate straight line LL, an exclusion flag is set for extracted vehicles that are farther than the longitudinal approximate straight line LL from the host vehicle 100 to exclude them from being alarm targets.

On the other hand, when it is not determined in S830 that the orientation of the shielding object is closer to the vehicle length direction than to the vehicle width direction, that is, when neither a lateral approximate straight line WL nor a longitudinal approximate straight line LL was set as the shielding boundary and no shielding object was detected in the search areas, the exclusion flag setting processing ends.

<Lateral Exclusion Processing>

Figure 17:
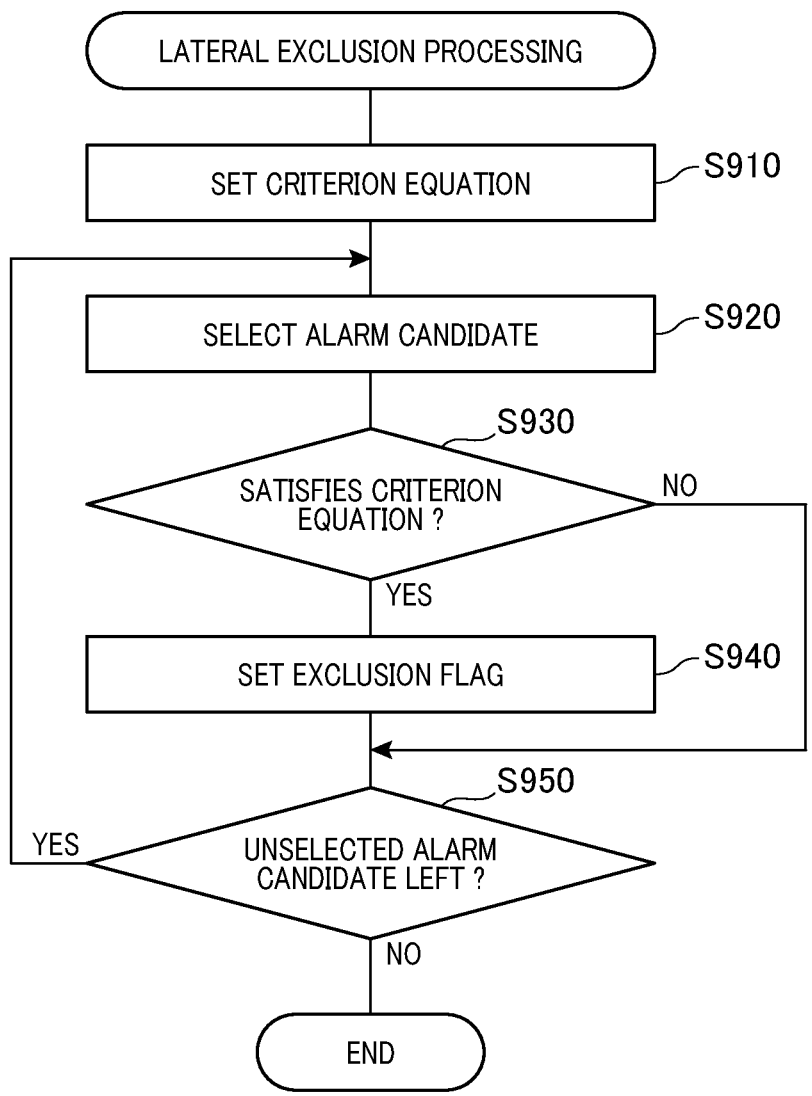
FIG. 17 is a flowchart showing the lateral exclusion processing.

Next, the details of the lateral exclusion processing executed by the master CPU 322a in S820 will be described with reference to the flowchart of FIG. 17.

In S910, the master CPU 322a sets a criterion equation. This criterion equation is an equation for determining whether an extraction vehicle is located far with respect to the lateral approximate straight line WL, and is represented by the following equation (6) or (7).

[Eq. 4]

$$y_j > ax_j + b + D \quad (6)$$

$$y_j < ax_j + b - D \quad (7)$$

a is the inclination, b is the y-intercept, yj is the y-coordinate of the selected extracted vehicle, xj is the x-coordinate of the selected extracted vehicle, and D is a constant for taking into account the measurement error of the position. The inclination a is the amount of change in the y-axis direction with respect to the amount of change in the x-axis direction. The y-intercept b is the value of y at the intersection of the straight line represented by the approximation expression and the y-axis when the constant D is not added (that is, when D=0), in other words, the value of y when both D and x are 0. A selected extracted vehicle refers to the extracted vehicle selected in S920, which will be described later.

The equation (6) is used when the shielding object corresponding to the approximation expression representing the lateral approximate straight line WL is in front of the host vehicle 100, and the equation (7) is used when the shielding object is behind the host vehicle 100. Whether the shielding object is in front of the host vehicle 100 is determined based on the value of the y-intercept b in the approximation expressions (6) and (7). That is, when the y-intercept b of the approximation expressions (6) and (7) has a positive value, it is determined that the shielding object is in front of the host vehicle 100, and when it has a negative value, it is determined that the shielding object is behind the host vehicle 100.

In S920, the master CPU 322*a* selects an extracted vehicle that has not yet been selected from the extracted vehicles acquired in S260.

In S930, the master CPU 322*a* determines whether the extracted vehicle selected in S920 satisfies the criterion equation set in S910.

When the master CPU 322*a* determines in S930 that the extracted vehicle selected in S920 does not satisfy the criterion equation, that is, when it determines that the extracted vehicle is not on the opposite side of the shielding object with respect to the host vehicle 100, the process proceeds to S950.

On the other hand, when the master CPU 322*a* determines in S930 that the extracted vehicle selected in S920 satisfies the criterion equation, that is, when it determines that the extracted vehicle is on the opposite side of the shielding object with respect to the host vehicle 100, the process proceeds to S940.

In S940, the master CPU 322*a* sets an exclusion flag for the extracted vehicle selected in S920.

In S950, the master CPU 322*a* determines if there is still an extracted vehicle that has not been selected in S920.

When the master CPU 322*a* determines in S950 that there is an extracted vehicle that has not yet been selected in S920, the master CPU 322*a* returns to S920 and executes the subsequent steps. That is, the process from S920 to S940 is repeated until all of the extracted vehicles are selected in S920.

On the other hand, when the master CPU 322*a* determines in S950 that there is no extracted vehicle that has not yet been selected in S920, that is, when it determines that all the extracted vehicles have been selected, the master CPU 322*a* executes the lateral exclusion processing.

The region represented by the criterion equation corresponds to the shielding region.

<Longitudinal Exclusion Processing>

Figure 18:
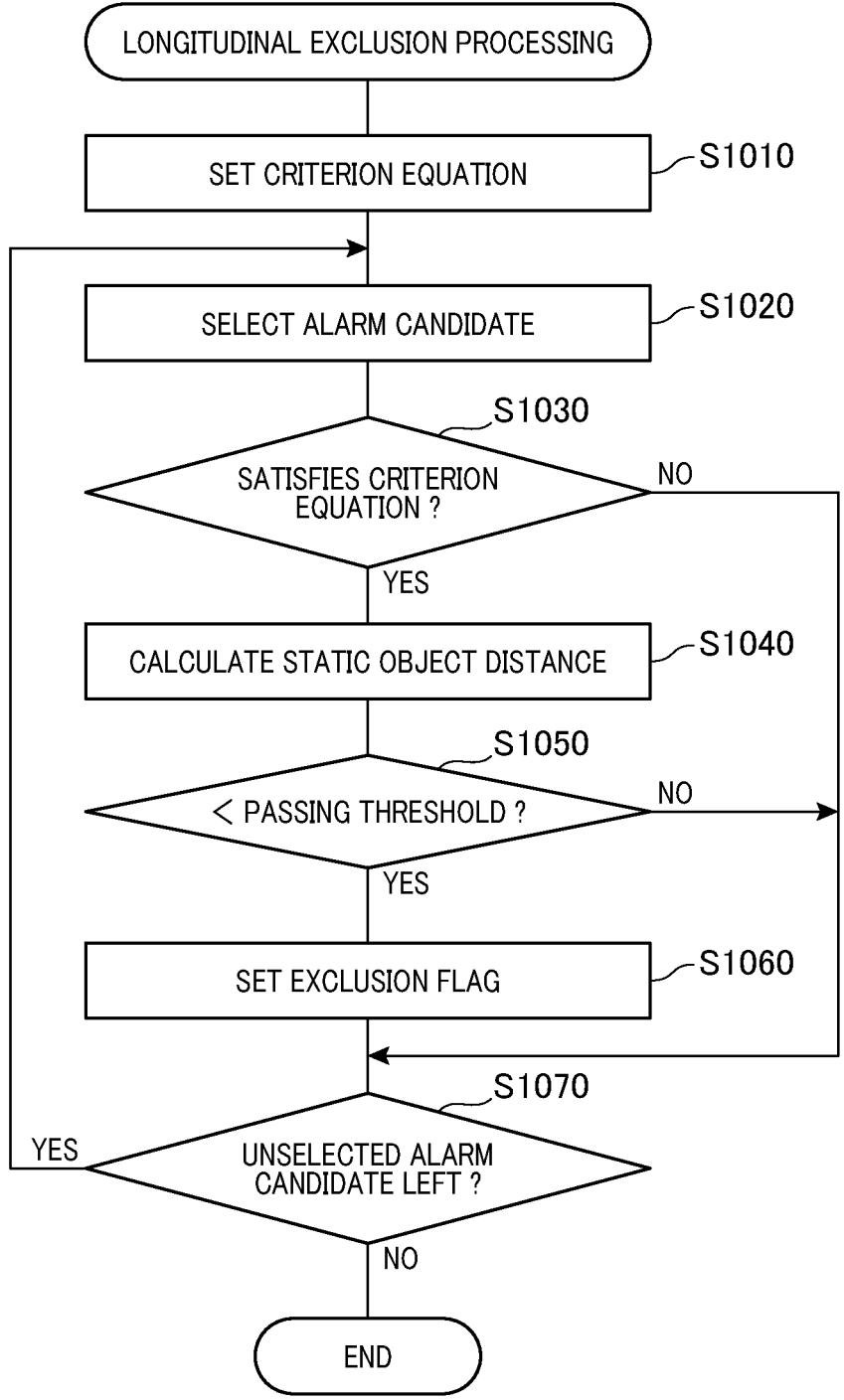
FIG. 18 is a flowchart showing the longitudinal exclusion processing.

Next, the details of the longitudinal exclusion processing executed by the master CPU 322*a* in S840 will be described with reference to the flowchart of FIG. 18.

The steps of the longitudinal exclusion processing are basically the same as those of the lateral exclusion processing. The processing of S910 to S930 corresponds to the processing of S1010 to S1030, and the processing of S940 to S950 corresponds to the processing of S1060 to S1070.

The differences from the lateral exclusion processing will be mainly described.

The longitudinal exclusion processing differs from the lateral exclusion processing in that the processing of S1040 and S1050 are inserted, and also the criterion equations are different.

The specific steps of the longitudinal exclusion processing will now be described.

In S1010, the master CPU 322*a* sets a criterion equation. In the longitudinal exclusion processing, the following equation (8) or equation (9) is set as the criterion equation.

[Eq. 5]

$$x_j > ay_j + b + D \tag{8}$$

$$x_j < ay_j + b - D \tag{9}$$

a is the inclination, b is the x-intercept, yj is the y-coordinate of the selected extracted vehicle, xj is the x-coordinate of the selected extracted vehicle, and D is a constant for taking into account the measurement error of the position. The inclination a is the amount of change in the x-axis direction with respect to the amount of change in the y-axis direction. The x-intercept b is the value of x at the intersection of the straight line represented by the approximation expression and the x-axis when the constant D is not added (that is, when D=0), in other words, the value of x when both D and y are 0. A selected extracted vehicle refers to the extracted vehicle selected in S1020, which will be described later.

The equation (8) is used when the shielding object corresponding to the approximation expression representing the longitudinal approximate straight line LL is on the right side of the host vehicle 100, and the equation (9) is used when the shielding object is on the left side of the host vehicle 100. Whether the shielding object is on the right side of the host vehicle 100 is determined based on the value of the x-intercept b in the approximation expressions (8) and (9). That is, when the x-intercept b of the approximation expressions (8) and (9) has a positive value, it is determined that the shielding object is on the right side of the host vehicle 100, and when it has a negative value, it is determined that the shielding object is on the left side of the host vehicle 100.

That is, in the lateral exclusion processing, the criterion equation uses the lateral approximate straight line WL as the criterion, whereas in the longitudinal exclusion processing, the criterion equation uses the longitudinal approximate straight line LL as the criterion. In addition, the directions to be judged differ between the criterion equations. That is, they differ in that, in the lateral exclusion processing, it is determined whether the shielding object is in front of or behind the lateral approximate straight line WL, whereas in the longitudinal exclusion processing, it is determined whether the shielding object is on the right side or left side of the longitudinal approximate straight line LL.

In S1020, the master CPU 322*a* selects an extracted vehicle that has not yet been selected from the extracted vehicles in S260.

In S1030, the master CPU 322*a* determines whether the extracted vehicle selected in S1020 satisfies the criterion equation set in S1010.

When the master CPU 322*a* determines in S1030 that the extracted vehicle selected in S1020 does not satisfy the criterion equation set in S1010, that is, when it determines that the extracted vehicle is not on the opposite side of the shielding object with respect to the host vehicle 100, the process proceeds to S1070.

On the other hand, when the master CPU 322*a* determines in S1030 that the extracted vehicle selected in S1020 satisfies the criterion equation set in S1010, that is, when it determines that the extracted vehicle is on the opposite side of the shielding object with respect to the host vehicle 100, the process proceeds to S1040.

In S1040, the master CPU 322*a* calculates the static object distance H. A case where the estimated trajectory P intersects the longitudinal approximate straight line LL as shown in FIG. 19A will be described as an example.

Figure 19A:
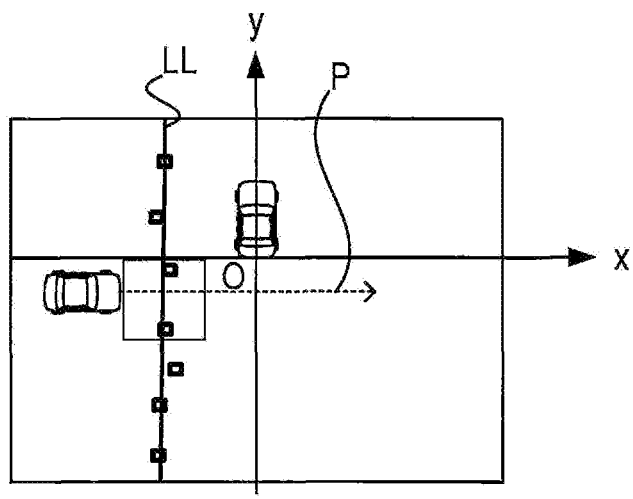
FIG. 19A is a diagram showing a case where the estimated trajectory intersects the longitudinal approximate straight line.
Figure 19B:
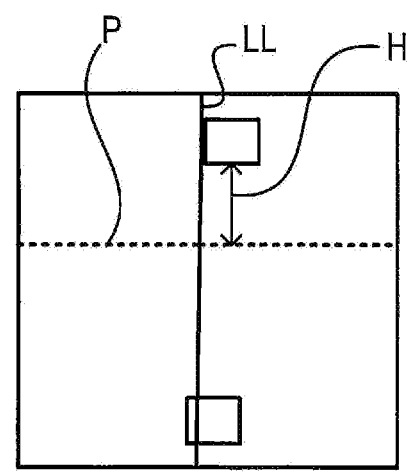
FIG. 19B is an enlarged view of the part of FIG. 19A where the longitudinal approximate straight line and the estimated trajectory intersect.

As shown in FIG. 19B, which is an enlarged view of the part of FIG. 19A where the estimated trajectory P intersects the longitudinal approximate straight line LL, a static object distance H is the distance from the estimated trajectory P of the selected extracted vehicle to the static reflection point that is closest to the estimated trajectory P.

In S1050, the master CPU 322a determines whether the static object distance H is smaller than a passing threshold. The passing threshold is set to a length of about half the vehicle width, for example, a length of about 1 m.

When the master CPU 322a determines in S1050 that the static object distance H is equal to or greater than the passing threshold, the process proceeds to S1070.

On the other hand, when the master CPU 322a determines in S1050 that the static object distance H is smaller than the passing threshold, the process proceeds to S1060.

In S1060, the master CPU 322a sets an exclusion flag for the extracted vehicle selected in S1020.

In S1070, the master CPU 322a determines if there is still an extracted vehicle that has not been selected in S1020.

When the master CPU 322a determines in S1070 that there is an extracted vehicle that has not yet been selected in S1020, the master CPU 322a returns to S1020 and executes the subsequent steps. That is, the process from S1020 to S1060 is repeated until all of the extracted vehicles are selected in S1020.

On the other hand, when the master CPU 322a determines in S1070 that there is no extracted vehicle that has not yet been selected in S1020, that is, when it determines that all the extracted vehicles have been selected, the master CPU 322a executes the longitudinal exclusion processing.

S1040 and S1050 correspond to the processing as the cancellation unit, and the static object distance H being smaller than the passing threshold corresponds to the canceling condition. The region represented by the criterion equation corresponds to the shielding region.

3. Effects

According to the embodiment described above in detail, the following effects can be obtained.

(1) According to the above-described embodiment, in the lateral approximation processing and the longitudinal approximation processing, the presence of a shielding object is estimated as the longitudinal approximate straight line LL and the lateral approximate straight line WL by robust estimation based on the positions of the static reflection points. This improves the accuracy of estimating the position of the shielding object.

(2) Further, according to the above-described embodiment, whether an object represented by an extracted vehicle collides with the host vehicle 100 is determined based on the position of the shielding object estimated with improved accuracy. This makes it possible to improve the accuracy of determining whether an object represented by an extracted vehicle collides with the host vehicle 100.

(3) It is determined whether the orientation of the shielding object is closer to an orientation along the vehicle width direction or an orientation along the vehicle length direction with respect to the host vehicle 100, based on the approximation errors d between the positions of the static reflection points and the approximate straight line. Then, a criterion equation which differs depending on the determined orientation is used to determine whether there is an object (an extracted vehicle) on the opposite side of the shielding object with respect to the host vehicle 100. Therefore, whether an object (an extracted vehicle) is on the opposite side of the shielding object with respect to the host vehicle 100 can be determined differently depending on whether the orientation of the shielding object is closer to an orientation along the vehicle width direction of the host vehicle 100 or an orientation along the vehicle length direction of the host vehicle 100.

(4) According to the above embodiment, the estimated trajectory P of an extracted vehicle is calculated when the orientation of the shielding object is close to an orientation along the longitudinal direction. Then, when the distance between the calculated estimated trajectory P of the extracted vehicle and the static reflection point closest to the estimated trajectory P is equal to or greater than a predetermined passing threshold, it is determined that the extracted vehicle may approach or collide with the host vehicle 100. Therefore, it is possible to extract an object (an extracted vehicle) that is on the opposite side of a shielding object but may pass through a gap in the shielding object (or between shielding objects) and approach or collide with the host vehicle 100.

(5) In the above embodiment, an approximate straight line is obtained by robust estimation based on the positions of the static reflection points. In the robust estimation, the distance between the approximate straight line and each static reflection point is calculated as a weight. This makes it possible to determine whether the approximate straight line matches with the position of the shielding object by calculating whether the average weight is equal to or greater than a predetermined weight threshold.

(6) In the above embodiment, it is determined that the reliability of the approximate straight line representing a shielding object is low when the number of static reflection points is less than a reflection point threshold in any of the set segmented areas. This makes it possible to avoid calculating the approximate straight line based on the positions of the static reflection points even though there is a segmented area in which the number of static reflection points is smaller than the reflection point threshold. As a result, the accuracy of shielding object detection can be improved.

(7) In the above embodiment, the shielding reliability is increased or reduced by 1 each time the reliability calculation processing is performed. The shielding reliability is reset to 0 when the master alarm processing is started, and the shielding threshold is set to 5. Therefore, in the first few cycles, the shielding reliability would not exceed the shielding threshold even if a shielding object is detected in the reliability calculation processing, and thus an exclusion flag would not be set for the extracted vehicles due to the shielding object. This means that it will be determined that the reliability of the shielding object is low until a shielding object is detected several times after starting the master alarm processing. Therefore, it is possible to prevent an extracted vehicle from being determined as not an alarm target at a stage immediately after starting the processing based on a shielding object that has not been detected enough times.

4. Other Embodiments

An embodiment for implementing the present disclosure has been described above, but the present disclosure is not limited to the above-described embodiment and can be implemented with various modifications.

(1) In the above embodiment, in the reliability calculation processing, when there is no static reflection point in an area, the shielding reliability is reduced. However, when no static reflection point is detected in an area in the reliability calculation processing, the shielding reliability does not necessarily have to be reduced. For example, when there is no static reflection point in one or both of the two outermost areas of the segmented areas, the shielding reliability may not be reduced.

According to such a configuration, even when a shielding object exists and one or both ends of the shielding object pertain to one or both of the outermost areas, it is possible to determine whether extracted vehicles should be excluded from possible alarm targets based on the position of the shielding object without reducing the reliability of the shield.

(2) Further, when a number of static reflection points equal to or larger than the shielding threshold is detected in each of the segmented areas other than the one or two outermost areas in which no static reflection point was detected, it may be determined that a shielding object exists in the segmented areas other than the one or two outermost areas in which no static reflection point was detected.

According to such a configuration, even when a shielding object exists and one or both ends of the shielding object pertain to one or both of the outermost areas, it is possible to recognize the shielding object and perform the processing for excluding extracted vehicles from alarm targets based on the locations of the shielding object and extracted vehicles.

(3) When the reflection points are acquired in the slave alarm processing and the master alarm processing of the above embodiment, for example, the acquired reflection points may include reflection points extrapolated by the slave radar module 311 and the master radar module 321. Extrapolation here refers to a process in which reflection points are repeatedly recognized, and reflection points that could not be recognized are determined to be recognized based on the information of reflection points that have been detected several times in previous reflection point recognition.

The shielding calculation processing may be performed so that it is not based on the extrapolated reflection points. Specifically, for example, when static reflection points are extracted in S420 of the shielding calculation processing, the extrapolated reflection points may be excluded from the static reflection points to be extracted.

Whether the reflection points are extrapolated may be acquired by the master CPU 322a as information on the reflection points from the slave radar module 311 or the master radar module 321.

The possibility of an object represented by the extrapolated reflection points actually existing is lower than that of an actually detected object. Therefore, it is possible to prevent an object that actually exists being determined to be outside the shielding object based on the object represented by the extrapolated reflection points, and thus being excluded from alarm targets. As a result, the accuracy of detecting an extracted vehicle approaching the host vehicle 100 can be improved.

(4) In the above embodiment, the slave radar module 311 is provided in the left rear part of the host vehicle 100, and the master radar module 321 is provided in the right rear part of the host vehicle 100. However, the positions of the slave radar module 311 and the master radar module 321 are not limited these positions. For example, the slave radar module 311 may be provided in the right rear part of the host vehicle 100, and the master radar module 321 may be provided in the left rear part of the host vehicle 100. In other words, the positions of the slave radar module 311 and the master radar module 321 in the host vehicle 100 may be switched.

(5) The thresholds set in the above embodiment may be set based on values calculated from experiments carried out in advance. Further, they may be set in consideration of the approximation errors d of when the corresponding judgment is performed.

Figure 20:
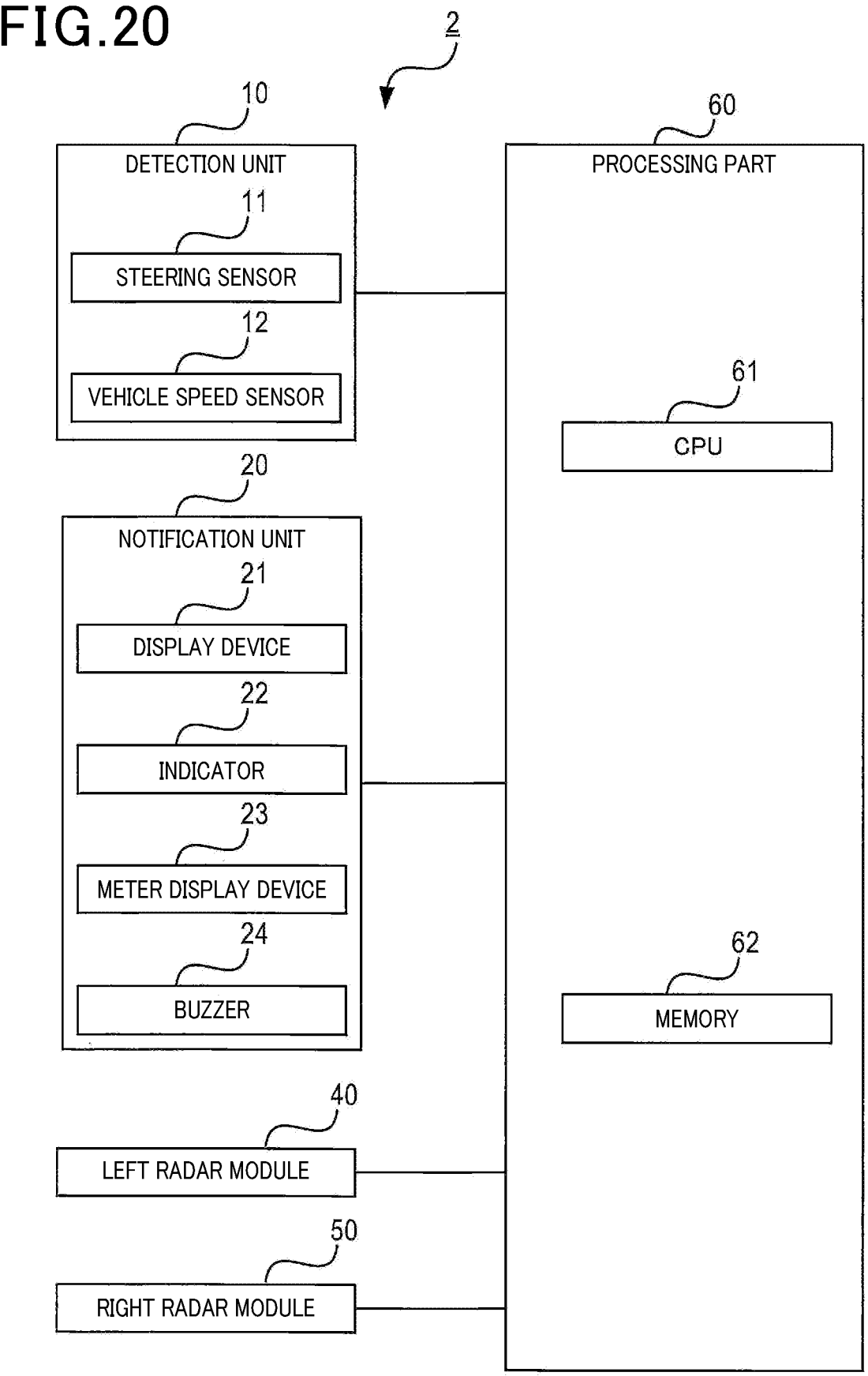
FIG. 20 is a diagram showing the configuration of an alarm system according to a modified example.

(6) In the above embodiment, the slave radar 31 and the master radar 32 are respectively equipped with the slave processing part 312 and the master processing part 322, which are microcomputers. However, it is not necessarily needed to provide a microcomputer in each of the slave radar 31 and the master radar 32. Specifically, as shown in FIG. 20, it may be constituted by a left radar module 40 and a right radar module 50 corresponding to the slave radar module 311 and the master radar module 321 included in the slave radar 31 and the master radar 32, and a processing part 60 corresponding to the slave processing part 312 and the master processing part 322. The processing part 60 may include a CPU 61 having a configuration corresponding to the slave CPU 312a and the master CPU 322a, and a memory 62 having a configuration corresponding to the slave memory 312b and the master memory 322b. That is, the radar modules and the microcomputer may be configured as separate components.

(7) In the above embodiment, a lateral approximate straight line WL is calculated based on the approximation errors d of the positions of the static reflection points in the vehicle length direction, and a longitudinal approximate straight line LL is calculated based on the approximation errors d of the positions of the static reflection points in the vehicle width direction. Then, whether the direction of the approximate straight line is closer to the vehicle length direction or the vehicle width direction is determined based on which of them has smaller approximation errors d. However, whether the direction of the approximate straight line is closer to the vehicle length direction or the vehicle width direction may be determined in different ways. For example, in the xy plane, it is also possible to calculate the approximation errors d of the positions of the static reflection points in the direction perpendicular to the approximate straight line, calculate the approximate straight line so that the approximation errors d of the positions become small, and determine the direction of the approximate straight line based on whether the slope of the calculated approximate straight line is greater than 1. That is, it may be determined according to the angle of the approximate straight line with respect to the vehicle length direction or the vehicle width direction of the host vehicle 100.

(8) In the above embodiment, it is determined whether to set an exclusion flag for each of the extracted vehicle in the exclusion flag setting processing, but the target for which whether to set an exclusion flag is determined is not limited to the extracted vehicles. For example, it is also possible to determine whether to set an exclusion flag for each of the alarm candidates, which are extracted vehicle for which alarm flags are set.

(9) The slave processing part 312, the master processing part 322, and their methods described herein may be realized by a dedicated computer provided by configuring a processor and a memory programmed to execute one or more functions embodied by computer programs. Alternatively, the slave processing part 312, the master processing part 322, and their methods described herein may be realized by a dedicated computer provided by configuring a processor with one or more dedicated hardware logic circuits. Alternatively, the slave processing part 312, the master processing part 322, and their methods described herein may be realized by one or more dedicated computers configured by combining a processor and a memory programmed to execute one or more functions with a processor configured by one or more hardware logic circuits. Further, the computer program may be stored in a computer-readable non-transitory tangible recording medium as instructions executed by the computer. The methods for realizing the functions of the components included in the slave processing part 312 and the master processing part 322 do not necessarily need to include software, and all of the functions may be realized by using one or more hardware components.

(10) A plurality of functions realized by a single component of the above embodiment may be realized by a plurality of components, or a single function realized by a single component may be realized by a plurality of components. Further, a plurality of functions realized by a plurality of components may be realized by a single component, or a single function realized by a plurality of components may be realized by a single component. Furthermore, a part of the configuration of the above embodiments may be omitted. Furthermore, at least a part of the configuration of the above embodiment may be added or substituted in the configuration of the other embodiments described above.

(11) In addition to the above-described alarm system, the present disclosure may be realized in various forms such as a system comprising the alarm system, a program for causing a computer to function as the alarm system, a non-transitory tangible recording medium such as a semiconductor memory storing the program, and an alarming method.

What is claimed is:

1. An alarm device mounted on a vehicle, comprising:
an acquisition part configured to acquire, from a radar module whose search areas are on a right-rear side and a left-rear side of a host vehicle, which is the vehicle on which the alarm device is mounted, reflection point information, which is information including a position and behavior of at least one reflection point detected in the search areas, and object information, which is information including a position and behavior of at least one object detected using the reflection point information;
an alarm judging part configured to use the object information acquired by the acquisition part to determine, for each of the at least one object specified from the object information, whether the object is an alarm candidate representing a moving body that requires notification to a driver of the host vehicle;
a notification part configured to issue a notification to the driver of the host vehicle about the alarm candidate when the host vehicle moves backward;
a static extraction part configured to use the reflection point information acquired by the acquisition part to extract a static reflection point, which is the reflection point in a static state, from the at least one reflection point specified from the reflection point information;
a shielding boundary setting part configured to calculate an approximate straight line by performing robust estimation on the position of the static reflection point specified from the reflection point information and set the approximate straight line as a shielding boundary; and
a suppression part configured to suppress notification by the notification part regarding the alarm candidate located in a shielding region, which is a region on the opposite side of the shielding boundary when viewed from the host vehicle.

2. The alarm device according to claim 1, wherein the shielding boundary setting part includes
a preliminary straight line approximation part configured to calculate a preliminary approximate straight line, which is the approximate straight line that minimizes the sum of at least one absolute value of at least one approximation error, which is a positional error of each of the at least one static reflection point,
a weight setting part configured to set, for each static reflection point, a weight that increases as the approximation error from the preliminary approximate straight line decreases, an average weight calculation part configured to calculate an average of the weight set for each static reflection point as an average weight,
a final straight line approximation part configured to calculate a final approximate straight line, which is the approximate straight line that maximizes the sum of the average weight calculated by the average weight calculation part, and
an approximate straight line setting part configured to set the final approximate straight line as the shielding boundary.

3. The alarm device according to claim 2, wherein
the preliminary straight line approximation part is configured to use a vehicle length approximation error, which is a distance between each static reflection point and the approximate straight line along a vehicle length direction of the host vehicle, as the approximation error to calculate the preliminary approximate straight line as a lateral preliminary straight line, and use a vehicle width approximation error, which is a distance between each static reflection point and the approximate straight line along a vehicle width direction of the host vehicle, as the approximate error to calculate the preliminary approximate straight line as a longitudinal preliminary straight line,
the weight setting part is configured to calculate, as the weight, a lateral weight that increases as the vehicle length approximation error decreases and a longitudinal weight that increases as the vehicle width approximation error decreases,
the average weight calculation part is configured to calculate, as the average weight, a lateral average weight which is an average of the lateral weights and a longitudinal average weight which is an average of the longitudinal weights,
the final straight line approximation part is configured to calculate, as the final approximate straight line, a lateral approximate straight line that maximizes the lateral average weight and a longitudinal approximate straight line that maximizes the longitudinal average weight, and
the approximate straight line setting part is configured to set the one of the lateral approximate straight line and the longitudinal approximate straight line that has a larger weight average calculated by the average weight calculation part as the shielding boundary.

4. The alarm device according to claim 3, further comprising
a direction determination part for determining whether a direction of the final approximate straight line is closer to the vehicle width direction or the vehicle length direction with respect to the host vehicle, wherein the direction determination part is configured to determine that the direction of the final approximate straight line is closer to the vehicle width direction when the lateral average weight is equal to or greater than the longitudinal average weight.

5. The alarm device according to claim 3, further comprising
a direction determination part for determining whether a direction of the final approximate straight line is closer to the vehicle width direction or the vehicle length direction with respect to the host vehicle, wherein
the direction determination part is configured to determine that the direction of the final approximate straight line is closer to the vehicle length direction when the lateral average weight is smaller than the longitudinal average weight.

6. The alarm device according to claim 2, further comprising
a direction determination part for determining whether a direction of the final approximate straight line is closer to a vehicle width direction or vehicle length direction with respect to the host vehicle, wherein
the direction determination part determines whether the direction of the approximate straight line is closer to the vehicle width direction or the vehicle length direction according to an angle between the final approximate straight line and the vehicle length direction of the host vehicle.

7. The alarm device according to claim 1, further comprising
an area setting part configured to set a plurality of segmented areas having a predetermined size segmented along a vehicle length direction of the host vehicle or a vehicle width direction of the host vehicle, and
a reliability calculation part configured to, for each of the segmented areas set by the area setting part, determine whether the number of the detected static reflection points in the segmented area is equal to or greater than a predetermined reflection point threshold, and increase a shielding reliability, which is reliability of the shielding boundary set by the shielding boundary setting part representing a shielding object, when the number is equal to or greater than the reflection point threshold, wherein
the shielding boundary setting part is configured to set the shielding boundary when it is determined that the shielding reliability calculated by the reliability calculation part is equal to or greater than a preset shielding threshold.

8. The alarm device according to claim 7, wherein
the reliability calculation part is configured to reduce the shielding reliability when the number of the detected static reflection points is smaller than the reflection point threshold in any of the segmented areas set by the area setting part.

9. The alarm device according to claim 7, wherein
when the number of the static reflection points is smaller than the reflection point threshold in one of two outermost areas, which are two segmented areas among the segmented areas set by the area setting part in which two ends of the approximate straight line are located, and the number of the static reflection points is equal to or greater than the reflection point threshold in each of the segmented areas other than said one of the two outermost segmented areas, the reliability calculation part increases the shielding reliability.

10. The alarm device according to claim 1, further comprising
a trajectory calculation part configured to calculate an estimated trajectory which is a trajectory the moving body, which is the alarm candidate, is expected to follow, and
a canceling part configured to cancel suppression of notification regarding the alarm candidate whose estimated trajectory has a positional relationship with the shielding region that satisfies a predetermined canceling condition.

11. The alarm device according to claim 10, wherein
the canceling condition includes that a static object distance, which is a distance between the estimated trajectory and the static reflection point that is closest to the estimated trajectory along the approximate straight line, is equal to or greater than a passing threshold which is a predetermined distance.

12. The alarm device according to claim 10, further comprising
a direction determination part for determining whether a direction of the shielding boundary is closer to a vehicle width direction or vehicle length direction with respect to the host vehicle, wherein,
when the direction determination part determines that the direction of the shielding boundary is closer to the vehicle length direction,
the canceling part cancels suppression of notification regarding the alarm candidate that satisfies the canceling condition.

* * * * *